(12) United States Patent
O'Connor

(10) Patent No.: US 10,585,536 B2
(45) Date of Patent: Mar. 10, 2020

(54) METHOD FOR TRANSITIONING POWER STATES OF AN ELECTRONIC DEVICE

(71) Applicant: Apple Inc., Cupertino, CA (US)

(72) Inventor: Sean E. O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 15/859,067

(22) Filed: Dec. 29, 2017

(65) Prior Publication Data

US 2019/0102001 A1 Apr. 4, 2019

Related U.S. Application Data

(60) Provisional application No. 62/566,147, filed on Sep. 29, 2017.

(51) Int. Cl.
| | | |
|---|---|---|
| G06F 3/044 | (2006.01) | |
| G06F 1/3234 | (2019.01) | |
| G06F 3/041 | (2006.01) | |

(52) U.S. Cl.
CPC ............ *G06F 3/044* (2013.01); *G06F 1/3262* (2013.01); *G06F 3/0416* (2013.01); *G06F 3/0418* (2013.01)

(58) Field of Classification Search
CPC .... G06F 1/3262; G06F 3/0416; G06F 3/0418; G06F 3/044
See application file for complete search history.

(56) References Cited

U.S. PATENT DOCUMENTS

| | | | | |
|---|---|---|---|---|
| 2012/0098766 | A1* | 4/2012 | Dippel | G06F 3/0416 345/173 |
| 2015/0338954 | A1* | 11/2015 | Yang | G06F 3/044 345/174 |
| 2015/0346903 | A1* | 12/2015 | O'Connor | G09G 5/003 345/173 |

\* cited by examiner

*Primary Examiner* — Nelson M Rosario
(74) *Attorney, Agent, or Firm* — Dentons US LLP

(57) ABSTRACT

The present disclosure generally relates to methods and devices for rejecting touches to an electronic device that are false positives for transitioning the device from a low-power state to a high-power state. The electronic device, includes a display and a touch-sensitive surface including an array of touch pixels, the array of touch pixels including one or more margin regions and one or more non-margin regions. While the display is in a low-power state, the electronic device detects, at the touch-sensitive surface, an input. In response to detecting the input and in accordance with at least a portion of the input being in the one or more margin regions and a determination that a first input-characteristic of the input meets at least one criterion of a first set of display-wake-rejection criteria, the electronic device forgoes transitioning the display from the low-power state to a high-power state.

23 Claims, 29 Drawing Sheets

TAP TO WAKE

700 ⤦

702
At an electronic device having a display and a touch-sensitive surface including an array of touch pixels, the array of touch pixels including one or more margin regions and one or more non-margin regions.

702
Wherein the one or more margin regions includes a first margin region that is adjacent to at least one edge of the touch-sensitive surface.

704
Wherein the touch sensitive surface includes one or more corner areas, and the one or more margin regions include a second margin region that includes at least one corner area of the touch-sensitive surface.

706
Wherein the one or more margin regions include a third margin region and a fourth margin region distinct from the third margin region, wherein the third margin region and the fourth margin region are non-symmetrical in shape.

708
While the display is in a low-power state, detecting, at the touch-sensitive surface, an input.

*FIG. 7A*

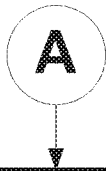

710
In response to detecting the input.

712
In accordance with at least a portion of the input being in the one or more margin regions and a determination that a first input-characteristic of the input meets at least one criterion of a first set of display-wake-rejection criteria, forgoing transitioning the display from the low-power state to a high-power state.

714
Wherein the first input-characteristic is a duration of the input, and the first set of display-wake-rejection criteria includes a criterion that is met when the duration of the input is less than a threshold duration.

716
Wherein the first input-characteristic is a diameter of the input, and the first set of display-wake-rejection criteria includes a criterion that is met when the diameter of the input is below a first predetermined diameter value.

718
Wherein the first input-characteristic is a degree of movement of the input, and the first set of display-wake-rejection criteria includes a criterion that is met when the degree of movement of the input is greater than a predetermined movement value.

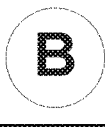

*FIG. 7B*

720
Wherein the first input-characteristic is a diameter of the input, and the first set of display-wake-rejection criteria includes a criterion that is met when the diameter of the input is above a second predetermined diameter value.

722
Wherein the first input-characteristic is a magnitude of a signal generated by the input that is indicative of the amount of water present on the touch-sensitive surface detected during the input, and the first set of display-wake-rejection criteria includes a criterion that is met when the amount of water present is above a predetermined water amount value.

724
Wherein the input is based on signals detected at a plurality of touch pixels of the array of touch pixels, the method further including, further in response to receiving the input, determining, based on the signals detected at the plurality of touch pixels and the spatial distribution of the plurality of touch pixels whether the spatial distribution of the plurality of touch pixels meets a pattern criteria, in accordance with the distribution of the plurality of touch pixels meeting the pattern criteria, determining if a maximum signal strength detected by any pixel of the plurality of touch pixels is below a predetermined maximum-signal strength value, and in accordance with the maximum signal strength detected by any pixel of the plurality of touch pixels being below a predetermined maximum-signal-strength value, forgoing transitioning the display from the low-power state to a high-power state.

*FIG. 7C*

```
┌─────────────────────────────────────────────────────────────────────────┐
│                                   726                                    │
│   In accordance with a determination that at least a portion of the touch input is in the   │
│  one or more margin regions and a determination that a second input-characteristic of the input │
│    meets at least one criterion of a second set of display-wake-rejection criteria, forgoing │
│          transitioning the display from the low-power state to a high-power state.          │
│                                                                         │
│   ┌─────────────────────────────────────────────────────────────────┐   │
│   │                              728                                 │   │
│   │  Wherein the input is based on signals detected at a plurality of touch pixels of the │   │
│   │    array of touch pixels, the second input-characteristic is the maximum signal   │   │
│   │    strength detected by any pixel of the plurality of touch pixels, the second set of │   │
│   │    display-wake-rejection criteria includes a criterion that is met when the maximum │   │
│   │     signal strength detected by any pixel of the plurality of touch pixels is below a │   │
│   │                second predetermined signal strength value.               │   │
│   └─────────────────────────────────────────────────────────────────┘   │
└─────────────────────────────────────────────────────────────────────────┘
```

```
┌─────────────────────────────────────────────────────────────────────────┐
│                                   730                                    │
│   Determining whether the first input-characteristic of the input meets the first set of display- │
│   wake-rejection criteria, and wherein determining whether the first input-characteristic of the │
│   input meets at least one criterion of the first set of display-wake-rejection criteria occurs after │
│            a predetermined period of time after the input is initially detected.           │
└─────────────────────────────────────────────────────────────────────────┘
```

```
┌─────────────────────────────────────────────────────────────────────────┐
│                                   732                                    │
│   Determining whether the second input-characteristic of the input meets the second set of │
│      display-wake-rejection criteria, and wherein determining whether the second input-     │
│    characteristic of the input meets at least one criterion of the second set of display-wake- │
│     rejection criteria occurs after a predetermined period of time after the input is initially │
│                                   detected.                                 │
└─────────────────────────────────────────────────────────────────────────┘
```

*FIG. 7D*

METHOD FOR TRANSITIONING POWER STATES OF AN ELECTRONIC DEVICE

CROSS-REFERENCE TO RELATED APPLICATIONS

This application claims priority to U.S. Provisional Patent Application Ser. No. 62/566,147, entitled "METHOD FOR TRANSITIONING POWER STATES OF AN ELECTRONIC DEVICE", filed on Sep. 29, 2017, the content of which is hereby incorporated by reference in its entirety.

FIELD

The present disclosure relates generally to managing power states of an electronic device, and more specifically to techniques for transitioning an electronic device from a low-power state to a high-power state.

BACKGROUND

Many modern electronic devices are capable of operating in both a low-power and a high-power state. Some devices include a display that is sensitive to touch inputs. There is therefore an opportunity to use the input detection of such electronic devices to control the transition of the electronic device from the low-power state to the high-power state.

BRIEF SUMMARY

Users of mobile electronic device often value a device that properly transitions from a low-power state to a high-power state based on the user's input. When a mobile electronic device improperly transitions to a high-power state, users can feel frustrated by the reduced battery life resulting from the increased and unnecessary power usage of the electronic device in the high-power state. The user can be further frustrated based on the context of the improper transition (e.g., false-positives such as if the electronic device transitions to a high-power state in a dark theater while watching a movie and thereby disrupting the user's movie experience). Conversely, a user can be frustrated if the device fails to properly recognize user input's intended to transition the device (e.g., false-negatives such as if the electronic device does not transition on a tap). An electronic device properly transitioning to the high-power state based on an input is particularly important since the display on modern electronic devices is one of the most significant loads on the device's battery.

It is important that a user input intended to power up the device is properly accepted. Users find it annoying performing multiple touches to power up an electronic device because their device improperly rejects user touches intended to power up the device.

Some techniques for transitioning an electronic device from a low-power to a high-power state are inefficient. For example, some existing techniques result in the electronic device transitioning from the low-power to the high-power state for unintended touches (e.g., water contacting the electronic device's touchscreen or from accidental user contact with the touchscreen (e.g., user crossing arms resulting in unintentional contact with touchscreen of electronic device being worn on wrist)). The electronic device transitioning from low-power to a high-power state based on these unintentional contacts results in inefficient power usage. This consideration is particularly important in battery-operated devices.

Accordingly, the present technique provides electronic devices with faster, more efficient methods for managing touches that may transition the device from a low-power to a high-power state. Such methods optionally complement or replace other methods for managing touches that may transition the device from a low-power to a high-power state. For battery-operated computing devices, such methods conserve power and increase the time between battery charges.

In accordance with some embodiments, a method performed at an electronic device having a display and a touch-sensitive surface including an array of touch pixels, the array of touch pixels including one or more margin regions and one or more non-margin regions is described. The method comprises: while the display is in a low-power state, detecting, at the touch-sensitive surface, an input; in response to detecting the input: in accordance with at least a portion of the input being in the one or more margin regions and a determination that a first input-characteristic of the input meets at least one criterion of a first set of display-wake-rejection criteria, forgoing transitioning the display from the low-power state to a high-power state.

In some embodiments, a non-transitory computer-readable storage medium is described. The non-transitory computer-readable storage medium stores one or more programs configured to be executed by one or more processors of an electronic device with a display and a touch-sensitive surface including an array of touch pixels, the array of touch pixels including one or more margin regions and one or more non-margin regions. The one or more programs including instructions for: while the display is in a low-power state, detecting, at the touch-sensitive surface, an input; in response to detecting the input: in accordance with at least a portion of the input being in the one or more margin regions and a determination that a first input-characteristic of the input meets at least one criterion of a first set of display-wake-rejection criteria, forgoing transitioning the display from the low-power state to a high-power state.

In some embodiments, a transitory computer-readable storage medium is described. The transitory computer-readable storage medium stores one or more programs configured to be executed by one or more processors of an electronic device with a display and a touch-sensitive surface including an array of touch pixels, the array of touch pixels including one or more margin regions and one or more non-margin regions. The one or more programs including instructions for: while the display is in a low-power state, detecting, at the touch-sensitive surface, an input; in response to detecting the input: in accordance with at least a portion of the input being in the one or more margin regions and a determination that a first input-characteristic of the input meets at least one criterion of a first set of display-wake-rejection criteria, forgoing transitioning the display from the low-power state to a high-power state.

In some embodiments, an electronic device is described. The electronic device comprises: a display; a touch-sensitive surface including an array of touch pixels, the array of touch pixels including one or more margin regions and one or more non-margin regions; one or more processors; and memory storing one or more programs configured to be executed by the one or more processors. The one or more programs including instructions for: while the display is in a low-power state, detecting, at the touch-sensitive surface, an input; in response to detecting the input: in accordance with at least a portion of the input being in the one or more margin regions and a determination that a first input-characteristic of the input meets at least one criterion of a first set of display-wake-rejection criteria, forgoing transitioning the display from the low-power state to a high-power state.

In some embodiments, an electronic device is described. The electronic device comprises: a display; a touch-sensitive surface including an array of touch pixels, the array of touch pixels including one or more margin regions and one or more non-margin regions; one or more processors; and memory storing one or more programs configured to be executed by the one or more processors. The one or more programs including instructions for: means for detecting, at the touch-sensitive surface and while the display is in a low-power state, an input; means, responsive to detecting the input, for: in accordance with at least a portion of the input being in the one or more margin regions and a determination that a first input-characteristic of the input meets at least one criterion of a first set of display-wake-rejection criteria, forgoing transitioning the display from the low-power state to a high-power state.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods for rejecting touches to an electronic device that are false positives for transitioning the device from a low-power state to a high-power state, thereby increasing the effectiveness, efficiency, and user satisfaction with such devices. Such methods may complement or replace other methods for rejecting touches to an electronic device that are false positives for transitioning the device from a low-power state to a high-power state.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7D are a flow diagram illustrating a method for operating an electronic device in accordance with some embodiments.

DESCRIPTION OF EMBODIMENTS

Figure 1A:
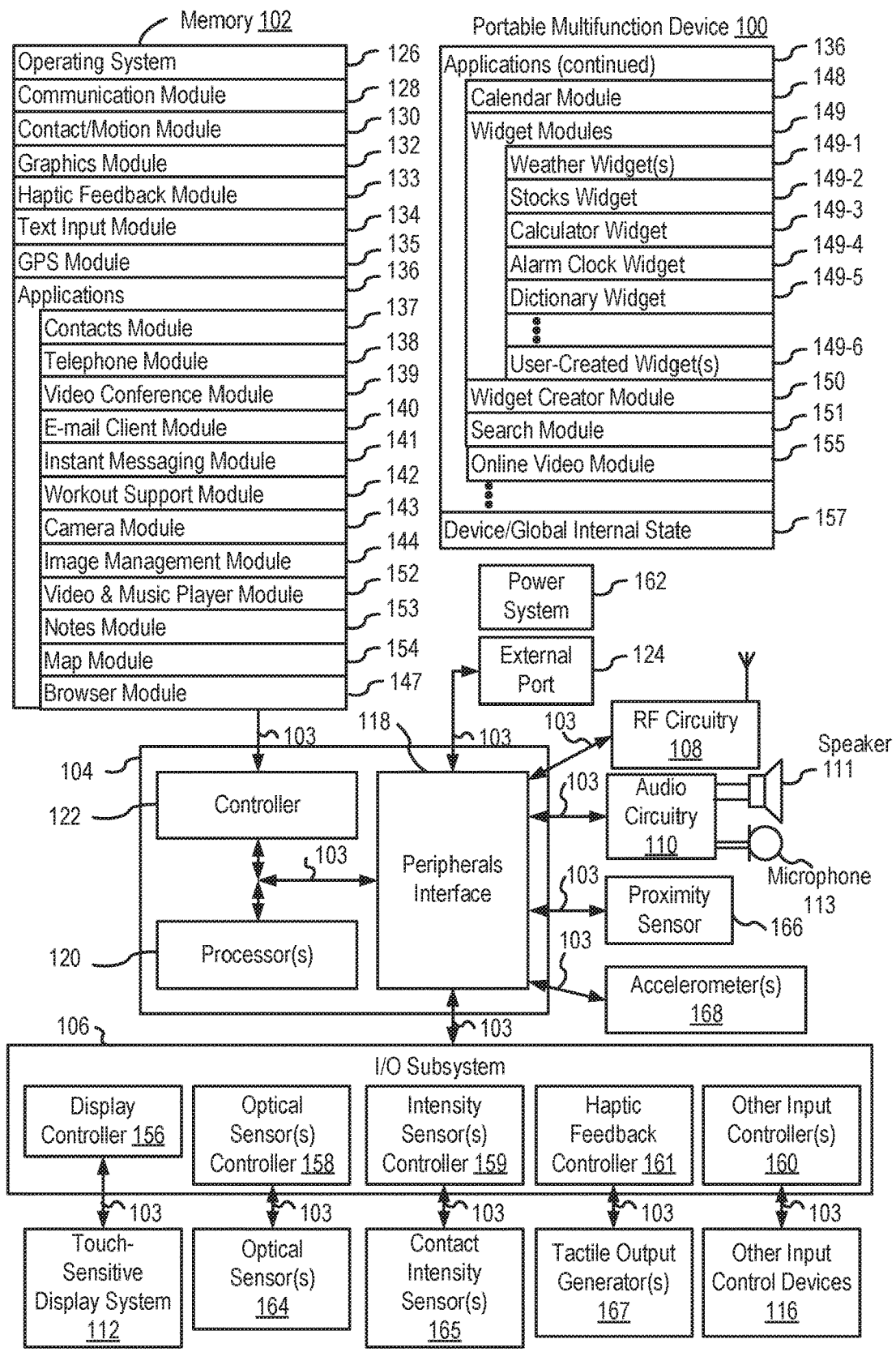
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices, which include a touch-sensitive surface, that provide efficient methods for rejecting inputs to the touch-sensitive surface that are not intended to transition the electronic devices from a low-power state to a high-power state. For example, inputs that are too small or too large, such that they usually do not represent an input in which a user intends to transition the electronic device from a low-power state to a high-power state, should be rejected Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing touches for transitioning an electronic device from a low-power state to a high-power state. FIGS. 6A-6K illustrate exemplary devices and methods for managing touches for transitioning an electronic device from a low-power state to a high-power state. FIGS. 7A-7D are a flow diagram illustrating methods of managing touches for transitioning an electronic device from a low-power state to a high-power state in accordance with some embodiments. The devices in FIGS. 6A-6K are used to illustrate the processes described below, including the processes in FIGS. 7A-7D.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.1 in, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. Nos. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
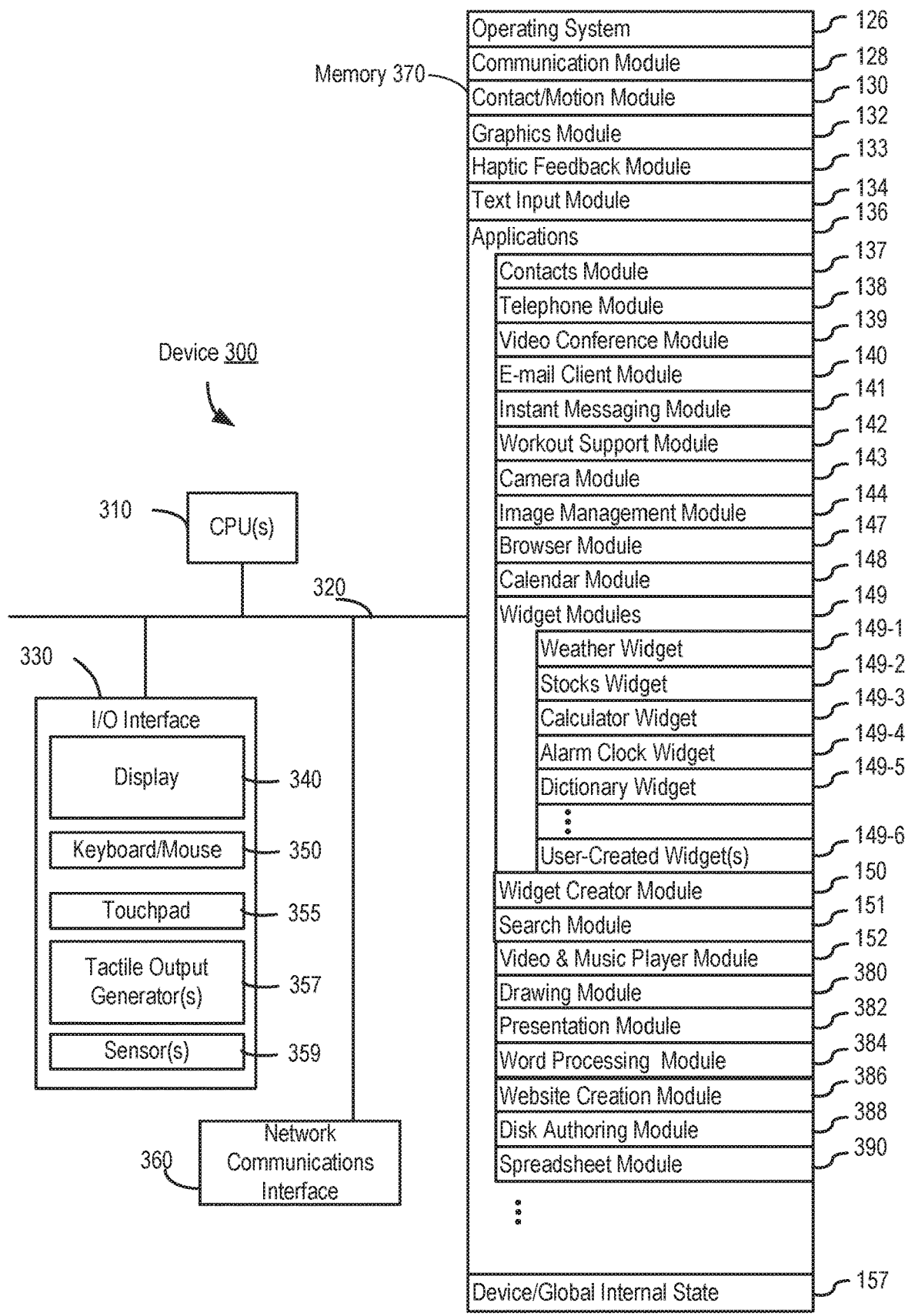
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images,
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout, and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
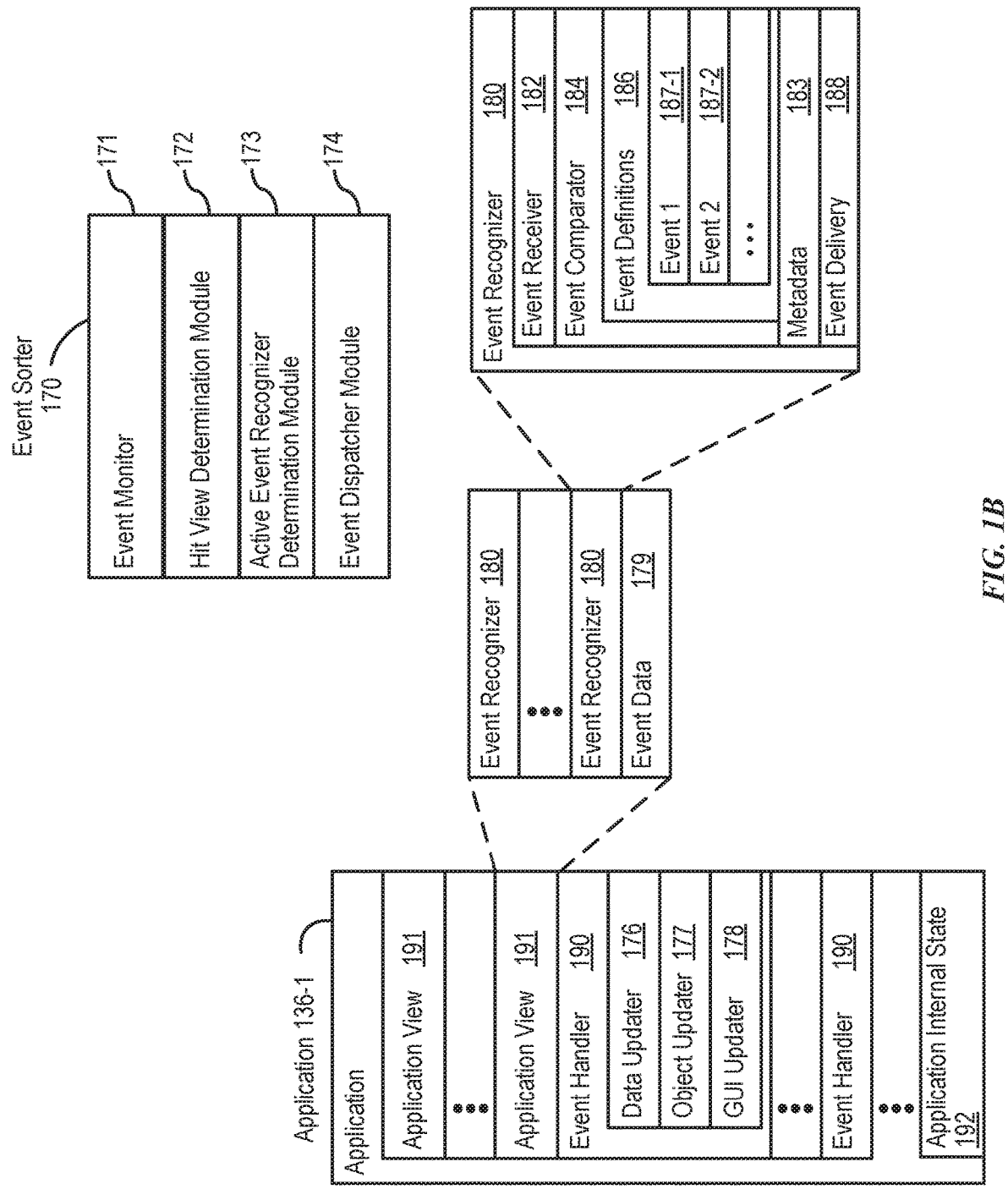
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
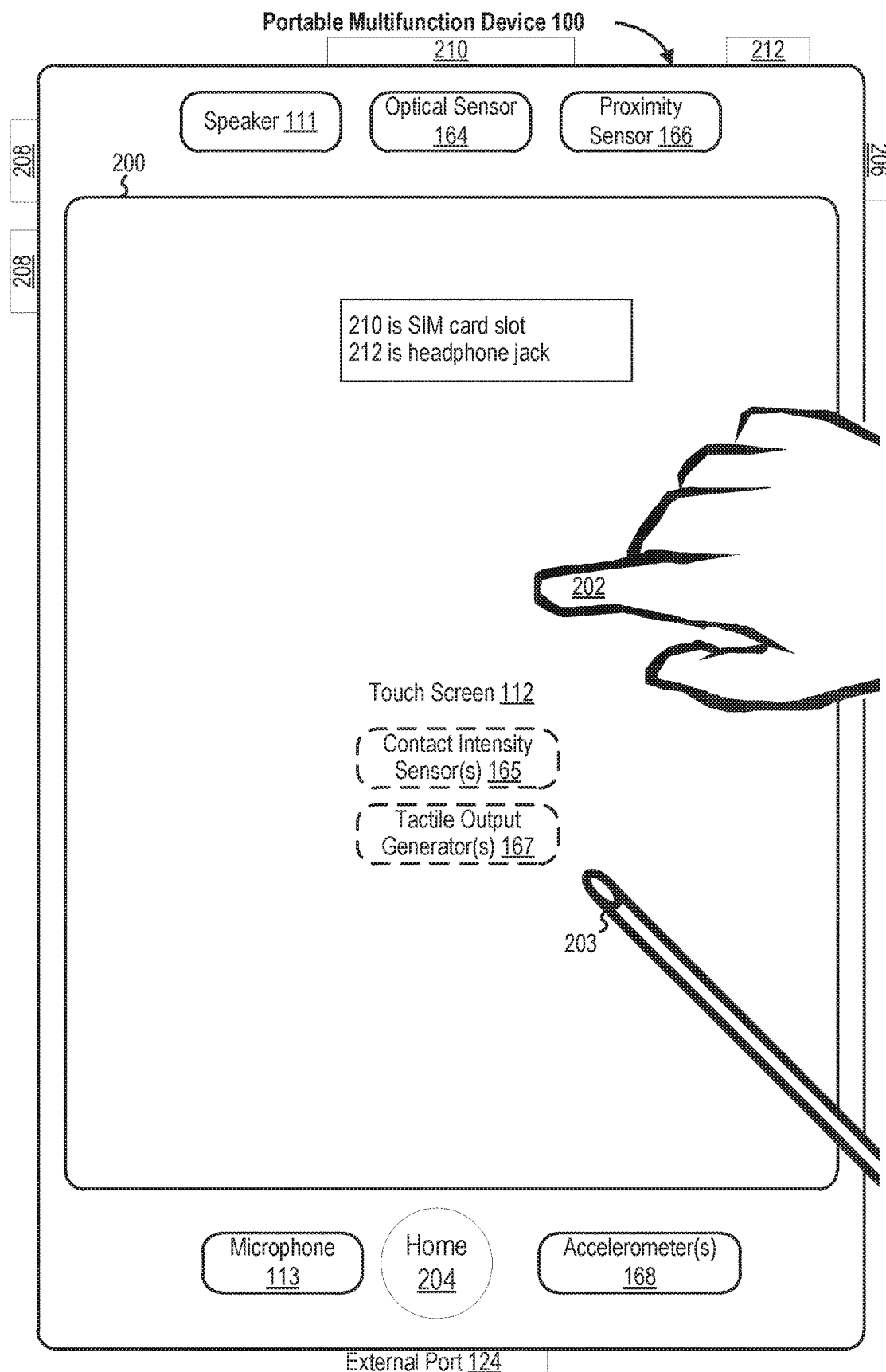
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
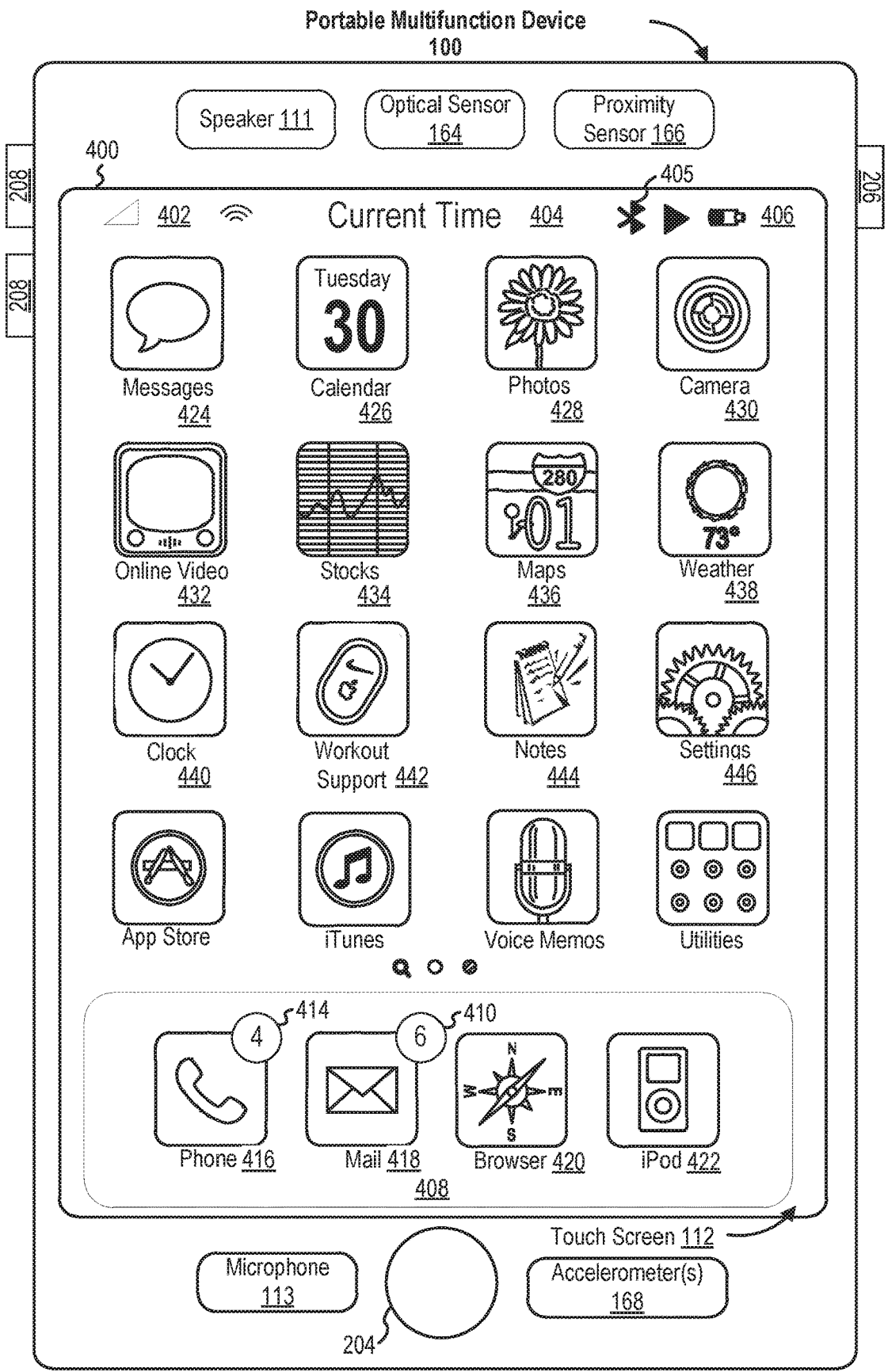
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera,"
  Icon 432 for online video module 155, labeled "Online Video,"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
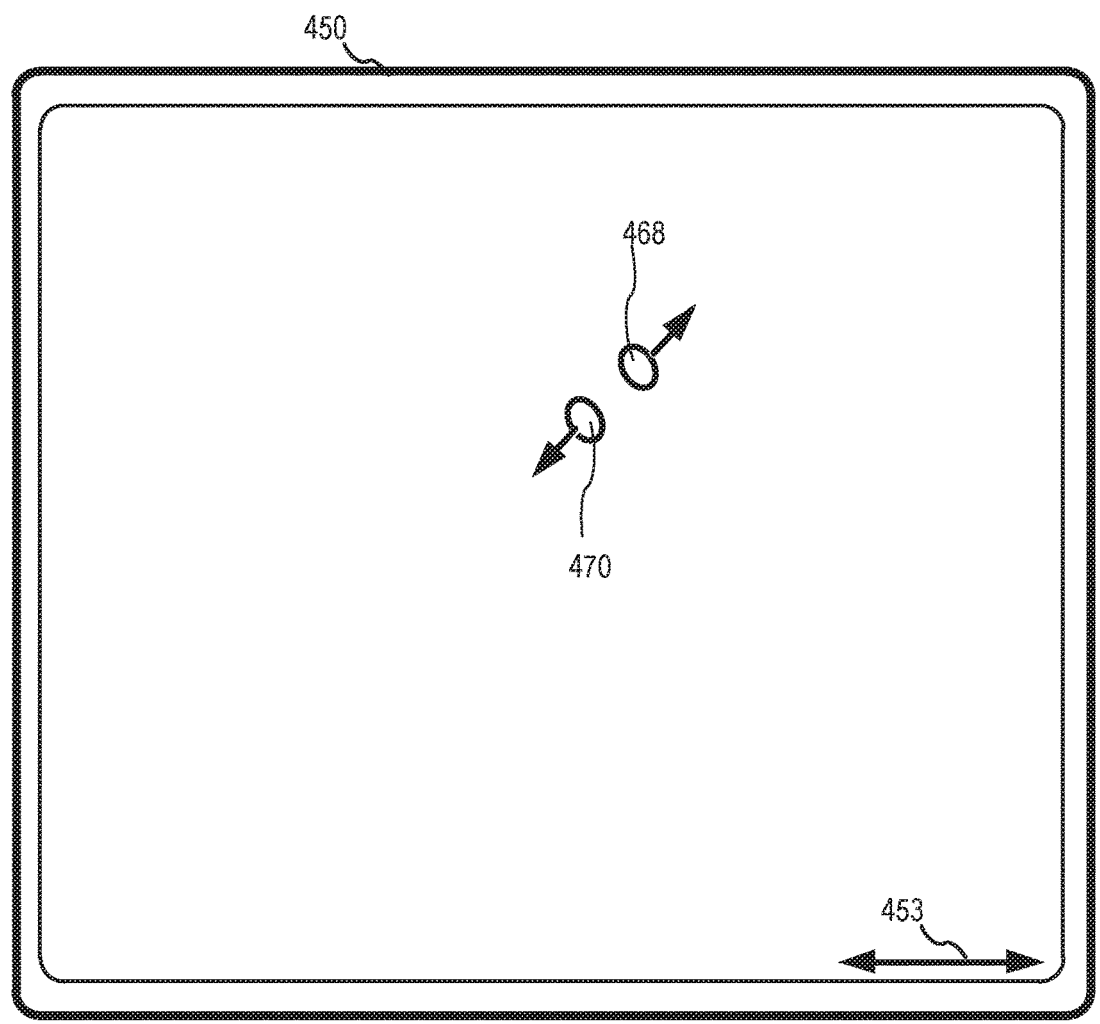
FIG. 4B illustrates an exemplary user interface for a multifunction device with a touch-sensitive surface that is separate from the display in accordance with some embodiments.
Figure 4B:
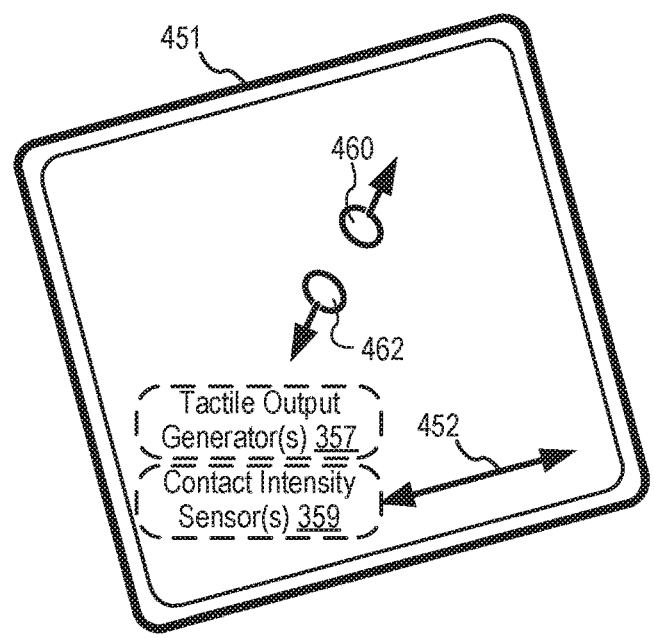

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
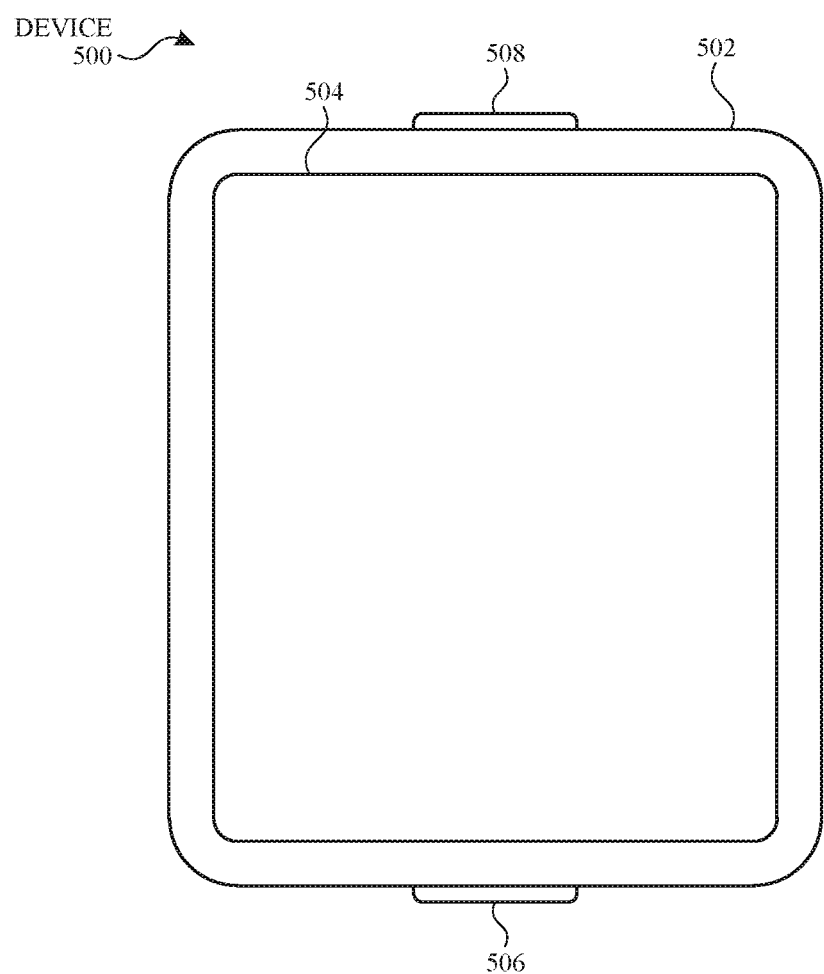
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
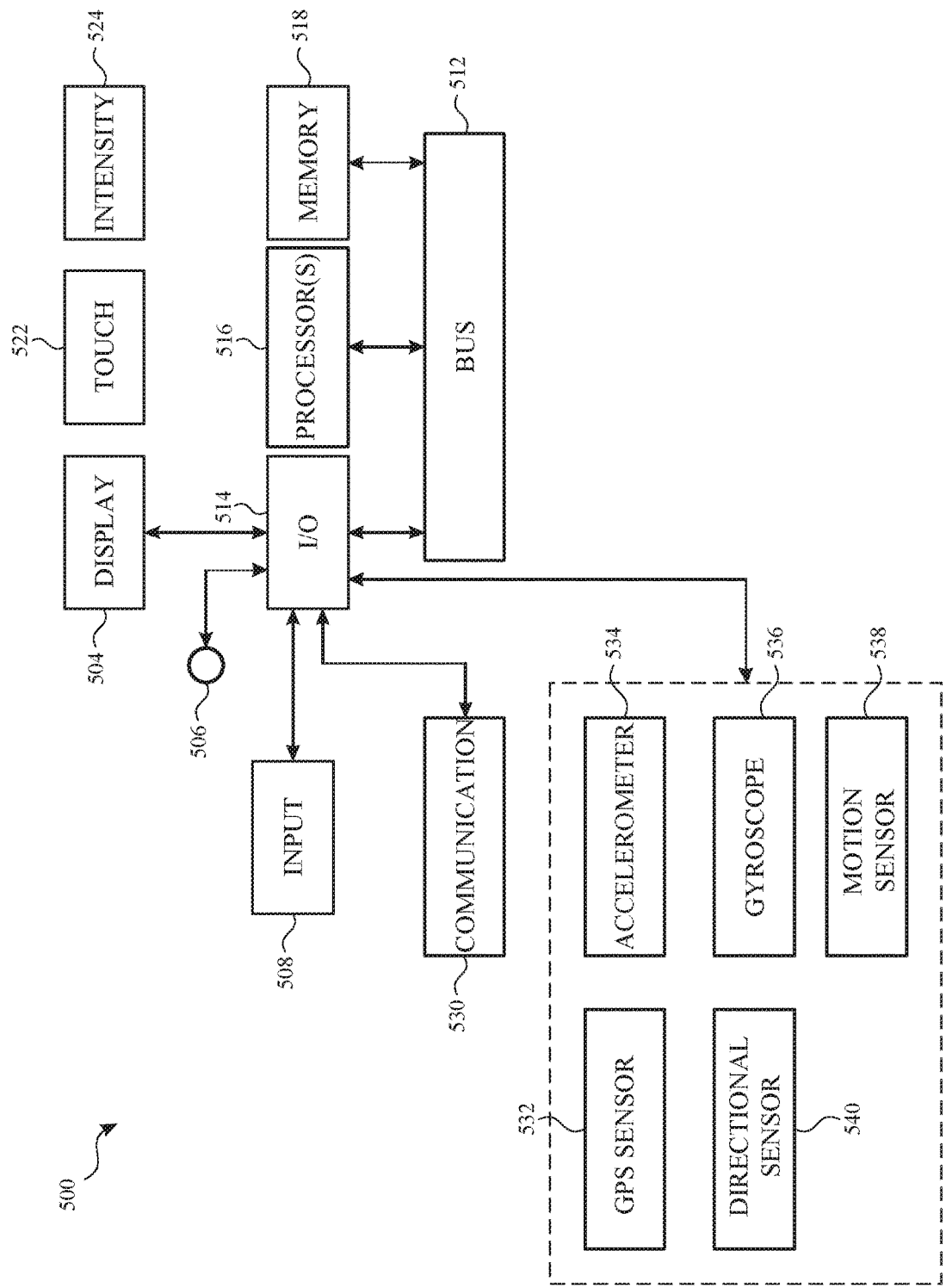
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7D). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
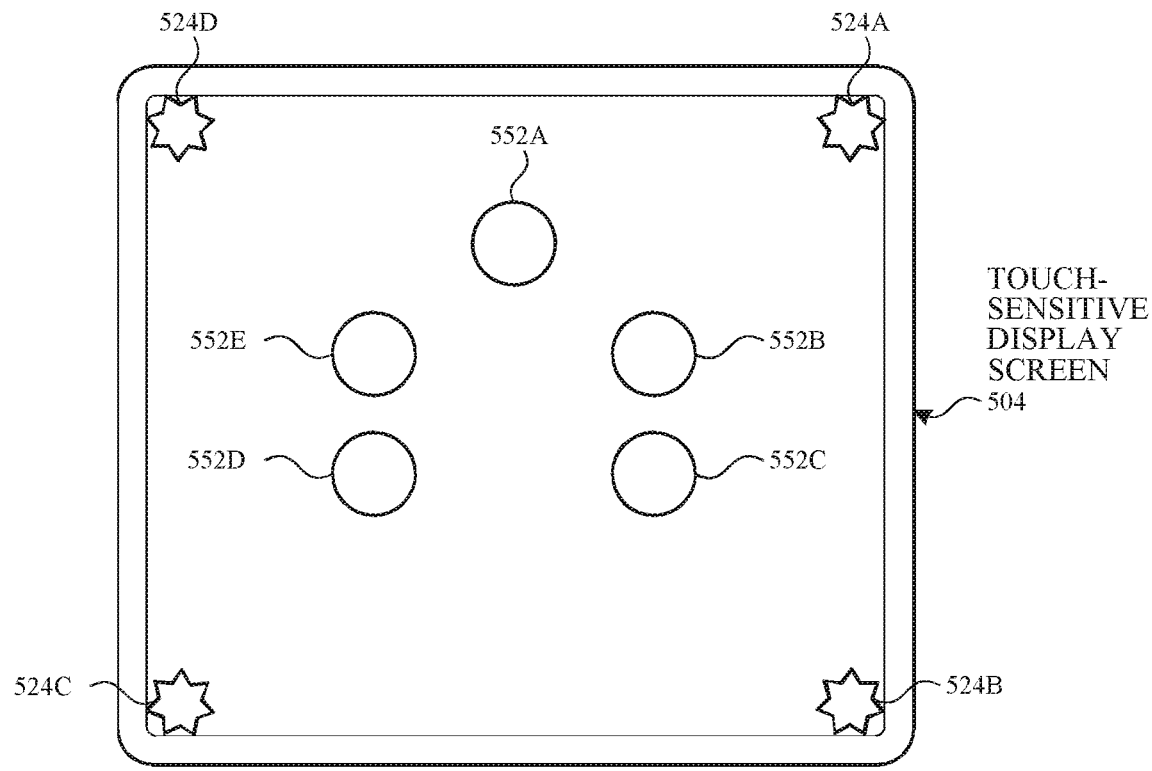
FIGS. 5C-5D illustrate exemplary components of a personal electronic device having a touch-sensitive display and intensity sensors in accordance with some embodiments.
Figure 5C:
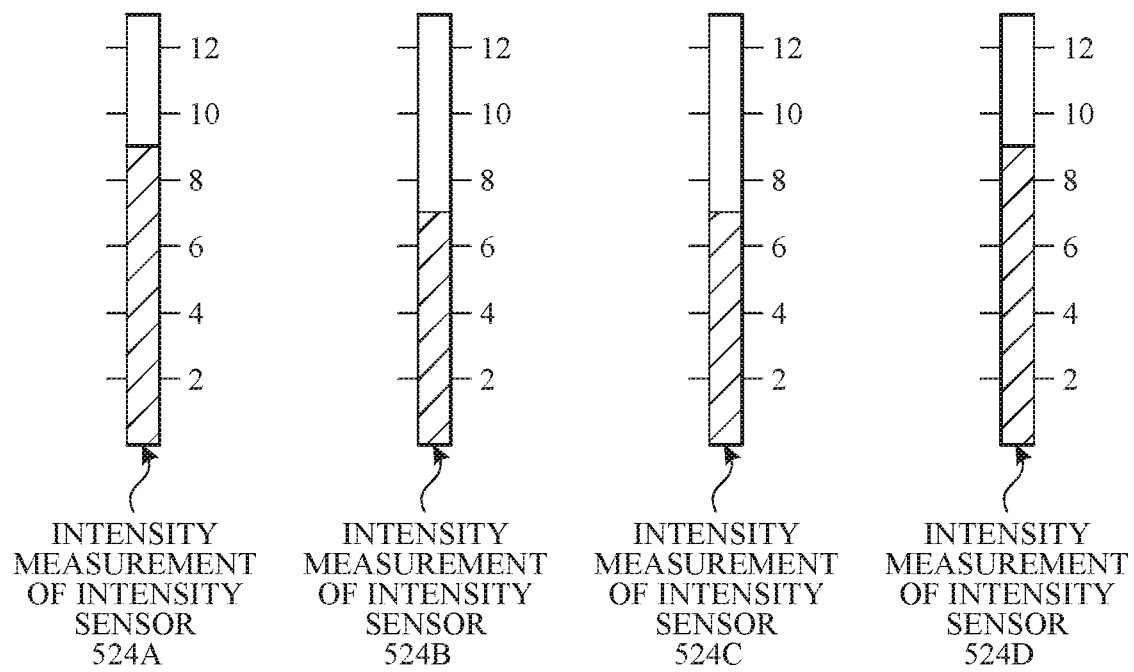
Figure 5D:
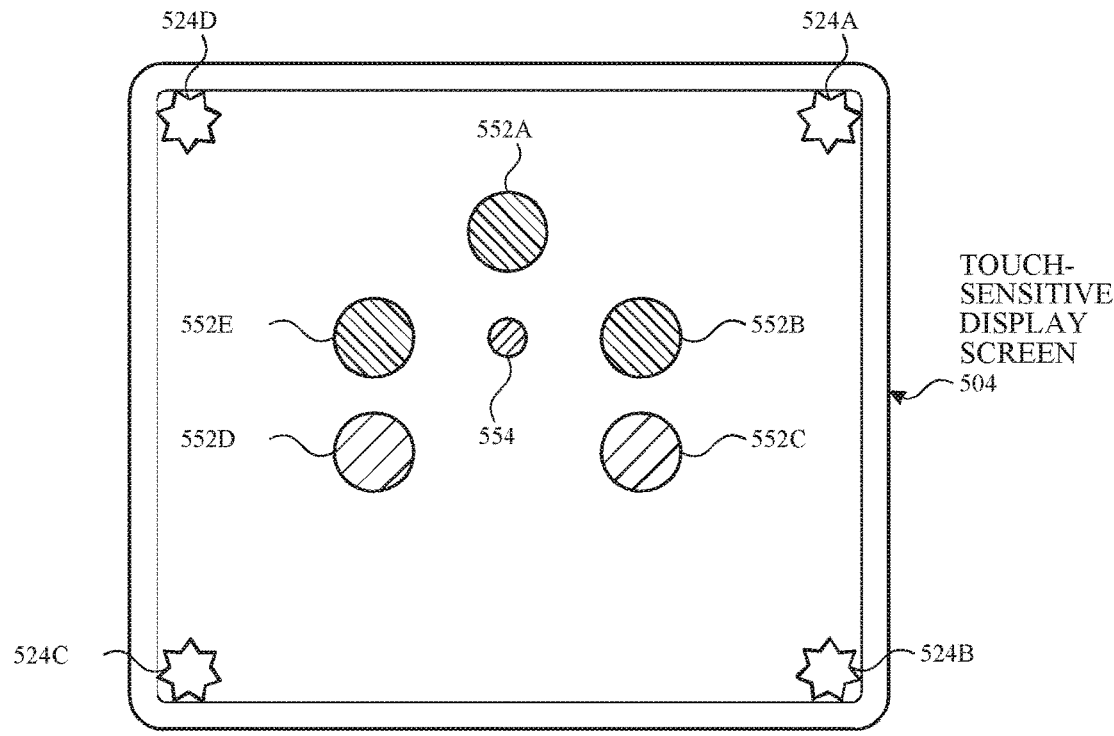
Figure 5D:
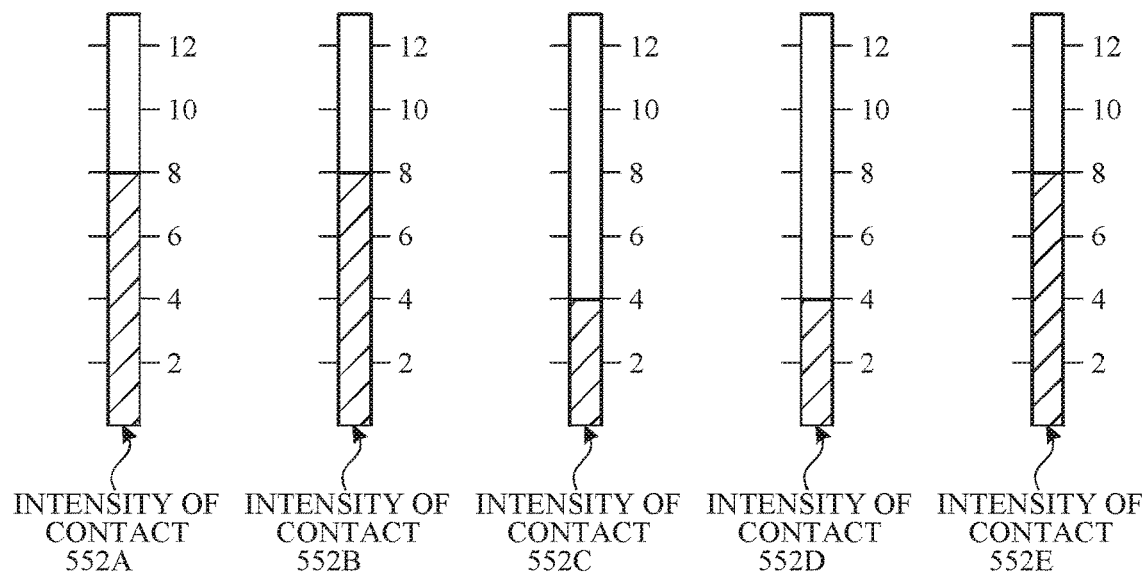

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A·(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
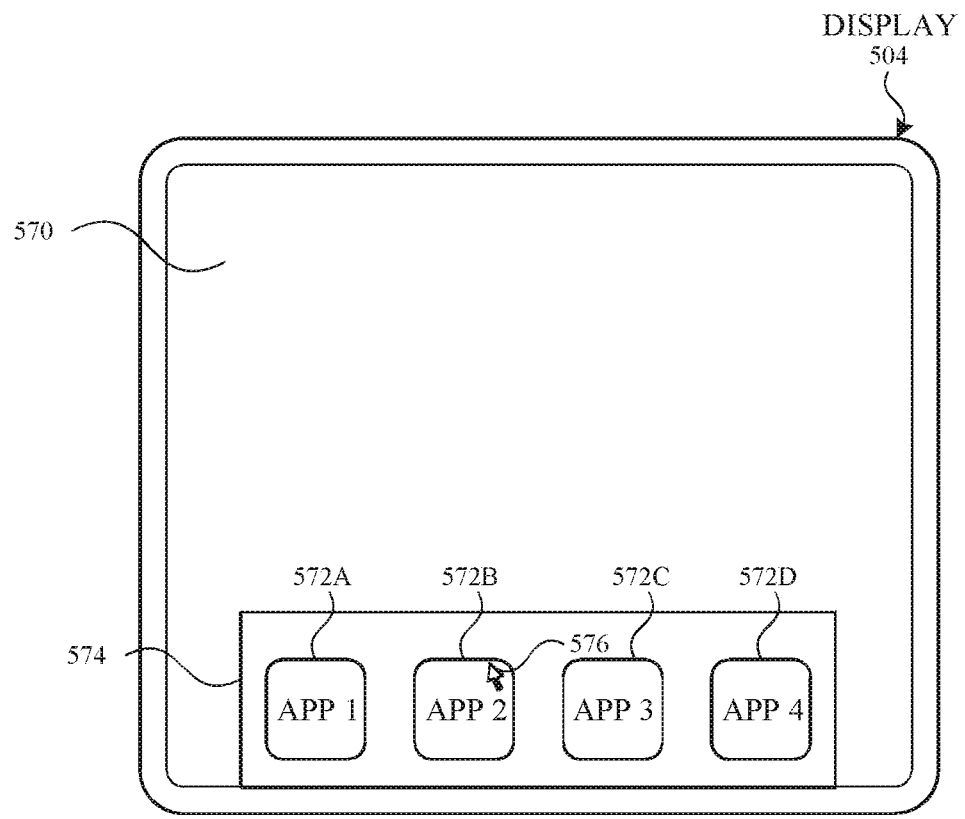
FIGS. 5E-5H illustrate exemplary components and user interfaces of a personal electronic device in accordance with some embodiments.
Figure 5E:
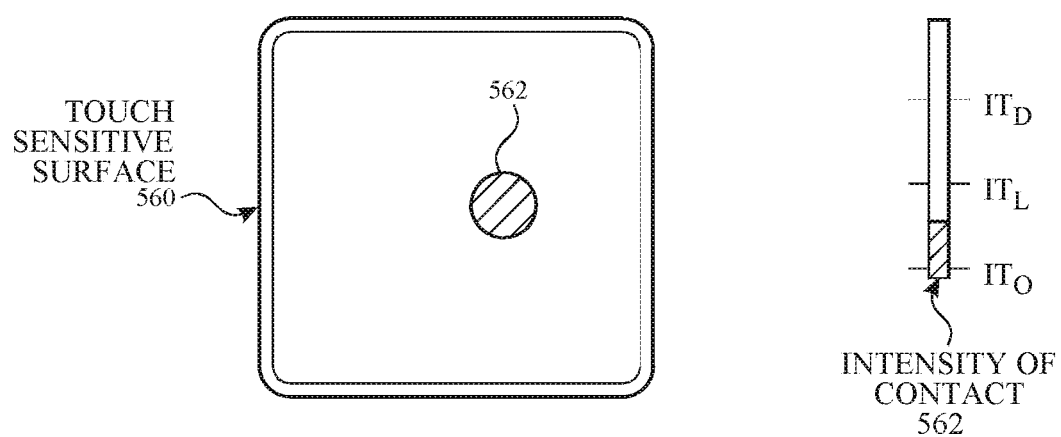
Figure 5F:
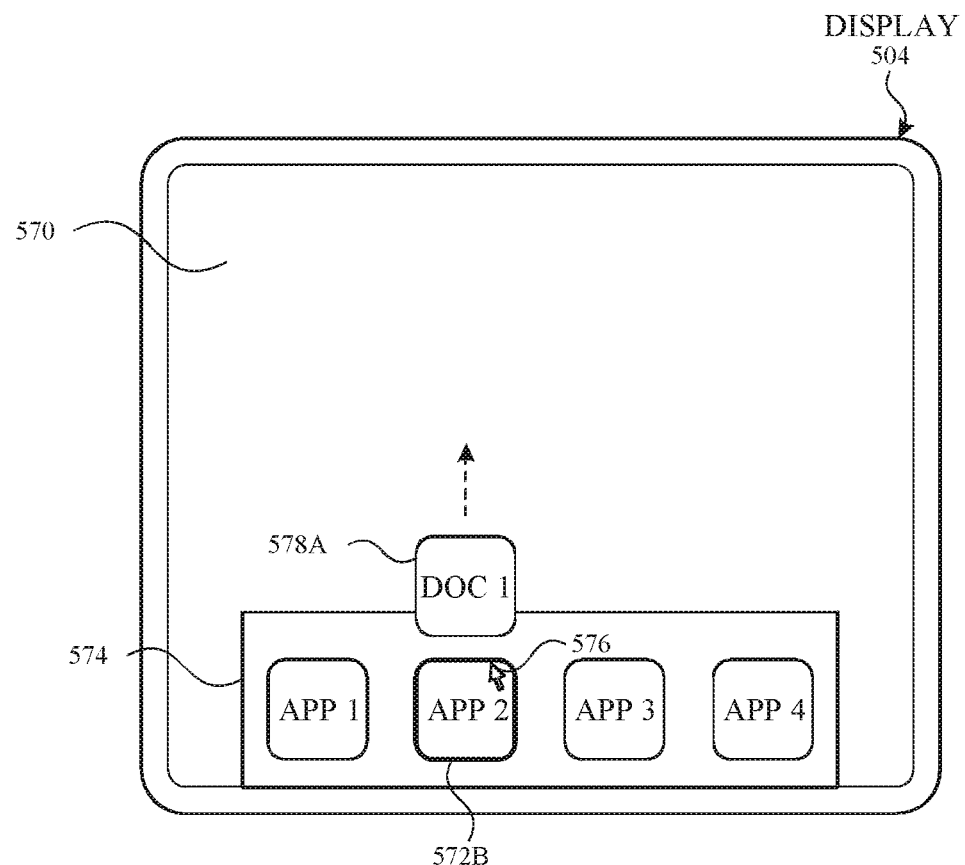
Figure 5F:
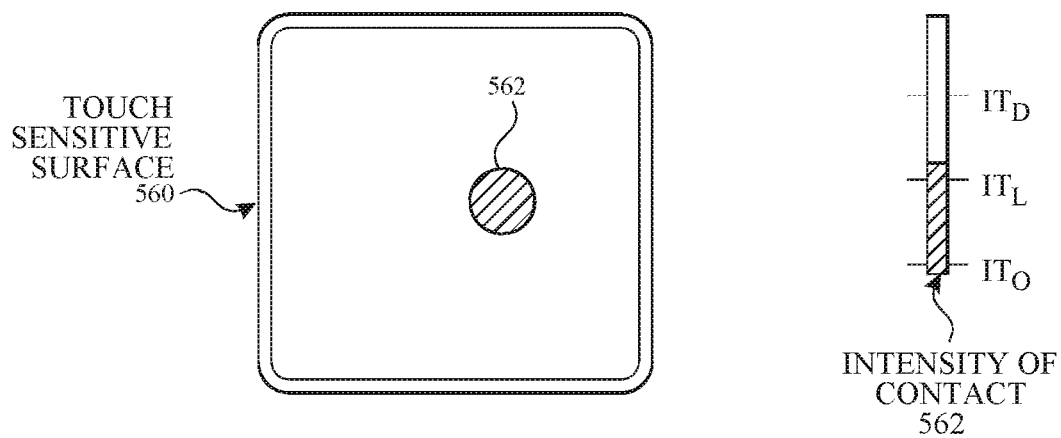
Figure 5G:
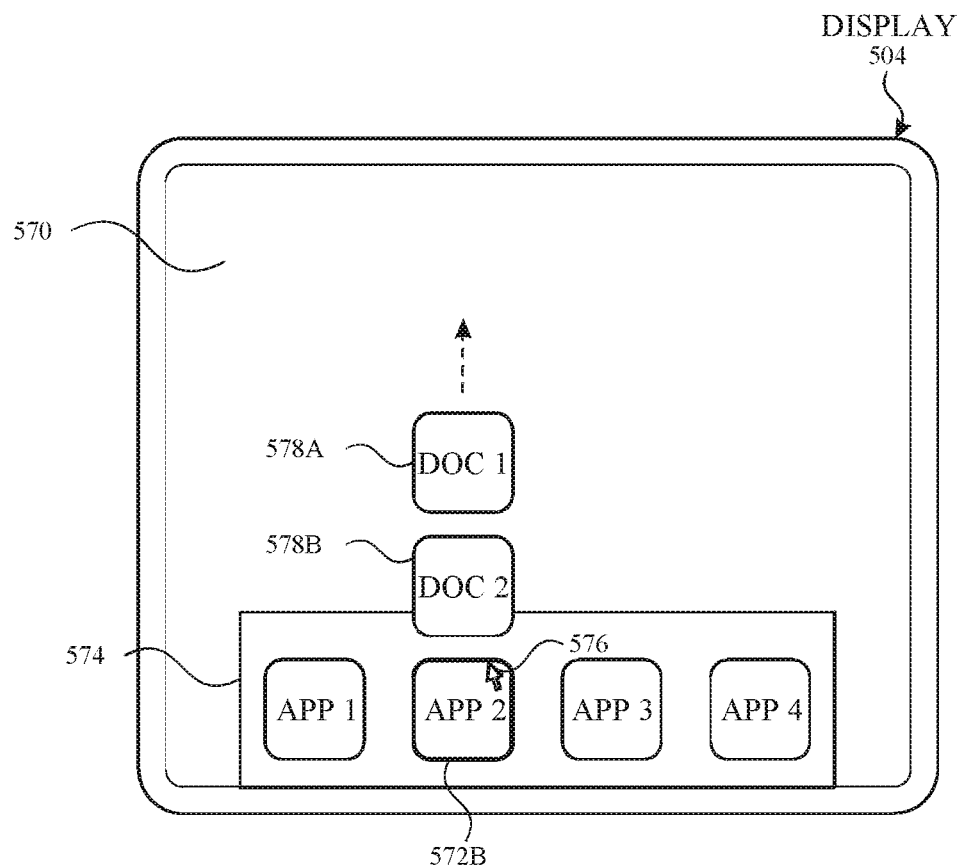
Figure 5G:
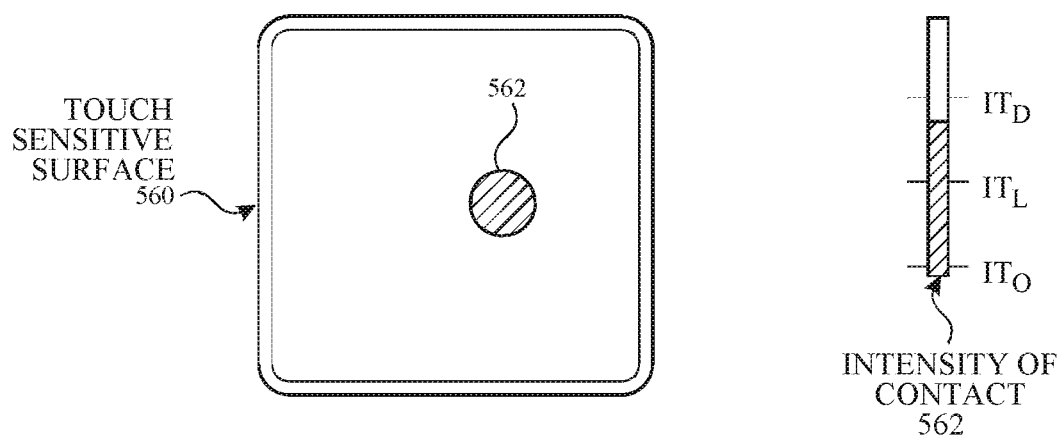
Figure 5H:
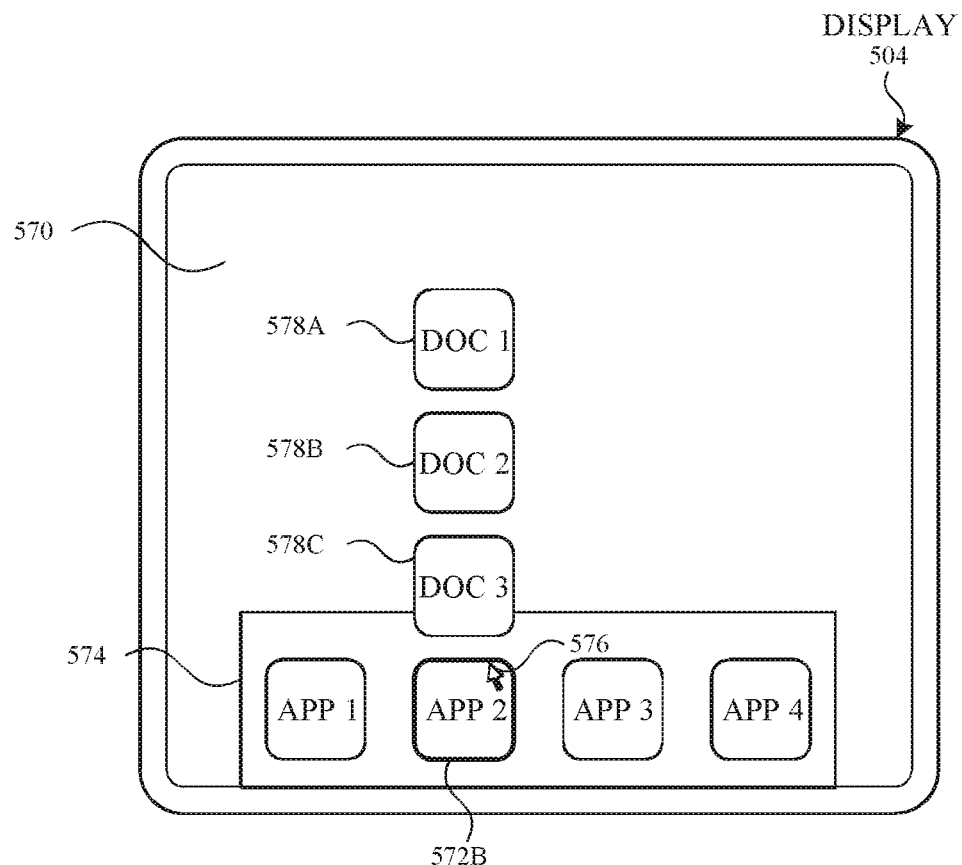
Figure 5H:
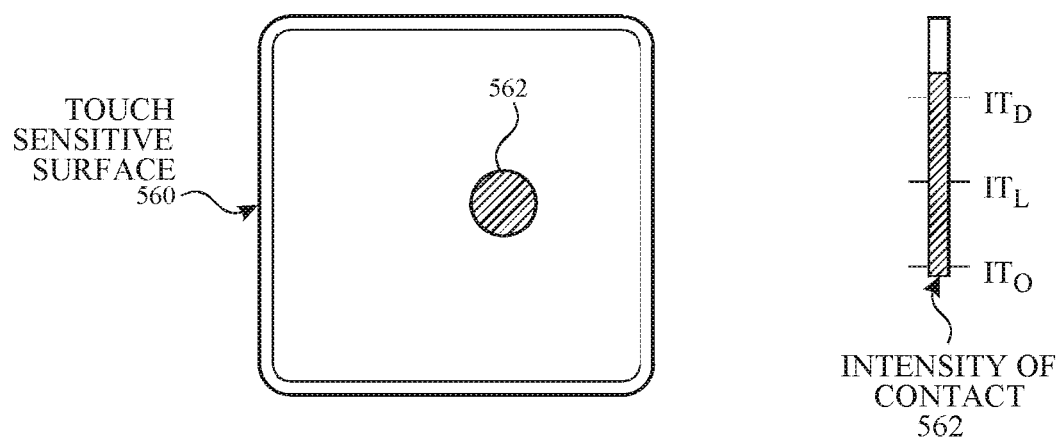

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards processes that are implemented on an electronic device, such as portable multifunction device 100, device 300, or device 500.

FIGS. 6A-6E illustrate an exemplary electronic device and methods for properly transitioning the device from a low-power state to a high-power state, in response to valid user inputs.

Figure 6A:
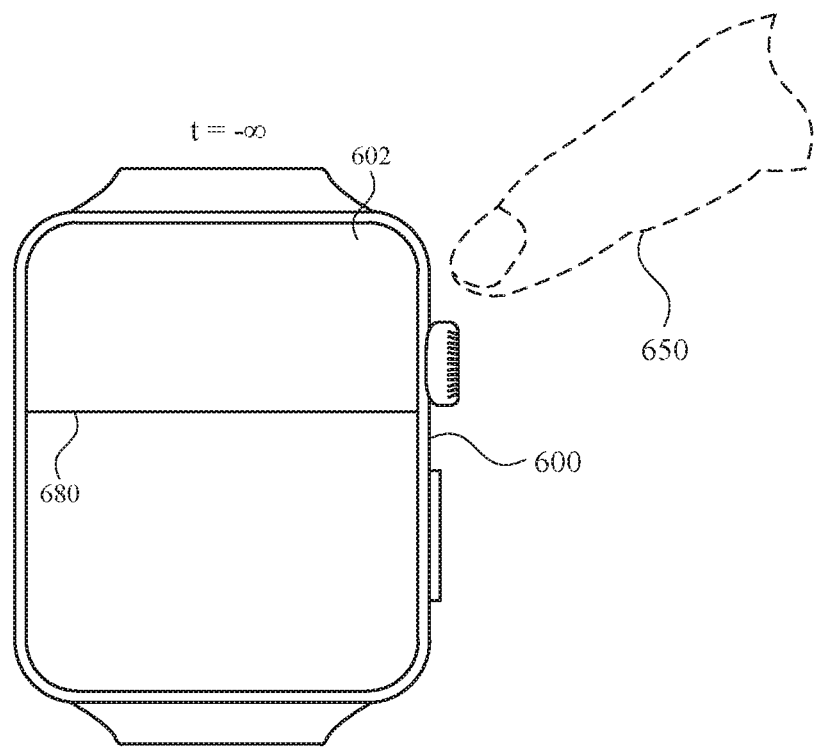
FIGS. 6A-6E illustrate exemplary devices and methods for ensuring that a valid touch for powering up an electronic device is not rejected.
Figure 6A:
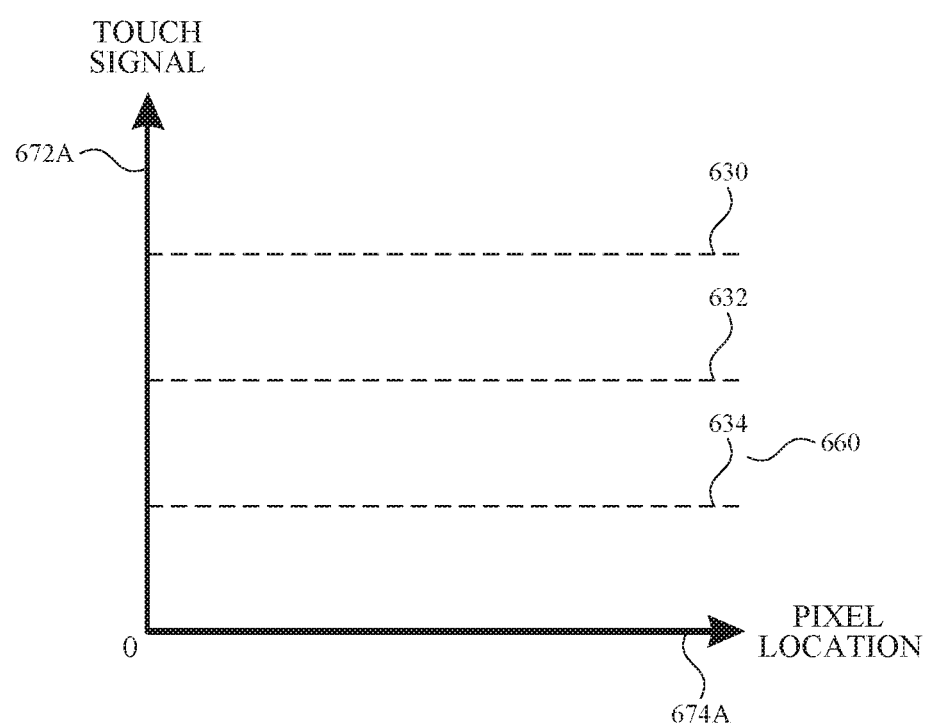

FIG. 6A illustrates device 600 with a touchscreen 602. Device 600 can be device 100, 300, or 500 (or include one or more features of those devices) in some embodiments. Touchscreen 602 can be touch sensitive display 112 in some embodiments. Optionally, the device 600 includes an array of touch pixels configured to respond to touches (e.g., 256 pixels wide by 256 pixels long). Optionally, device 600 includes one or more contact intensity sensors configured to detect a characteristic intensity of a contact to the touch-sensitive display (e.g., contact intensity sensors 165).

As shown in FIG. 6A, finger 650 has yet to touch the touchscreen 602 and device 600 is in a low-power state with touchscreen 602 operating in a minimal power state (e.g., a powered down state for at least the touchscreen 602). FIG. 6A is labeled with a time of t=−∞ to indicate that no touch has occurred, with t=0 msec representing the time when the device 600 first detects touch signals that the device 600 determines could potentially be a valid touch (e.g., a touch that is valid for transitioning the power state of the device).

FIG. 6A also includes touch signal graph 660, which depicts the touch signal strength of each pixel in a row of pixels 680 horizontally spaced across touchscreen 602 (e.g., the row of pixels 680 represents a cross section of touchscreen 602). The x-axis of the touch signal graph 660 represents the horizontal location of each pixel in the row of pixels 680 with the left most pixel on the touchscreen 602 represented by x=0 and the right most pixel represented by a value greater than 0 and positioned at horizontal mark 674A on the touch signal graph 660. The y-axis of the touch signal graph 660 represents the touch signal strength (e.g., a voltage signal strength or a unit-less value derived from a voltage signal) of pixels on the touchscreen 602, with a value of 0 representing no touch and vertical mark 672A representing the maximum possible touch signal value (e.g., 1024 count). Touch signal graph 660 indicates that no pixel in the row of pixels 680 on the touchscreen 602 detects a touch signal value greater than 0.

Figure 6B:
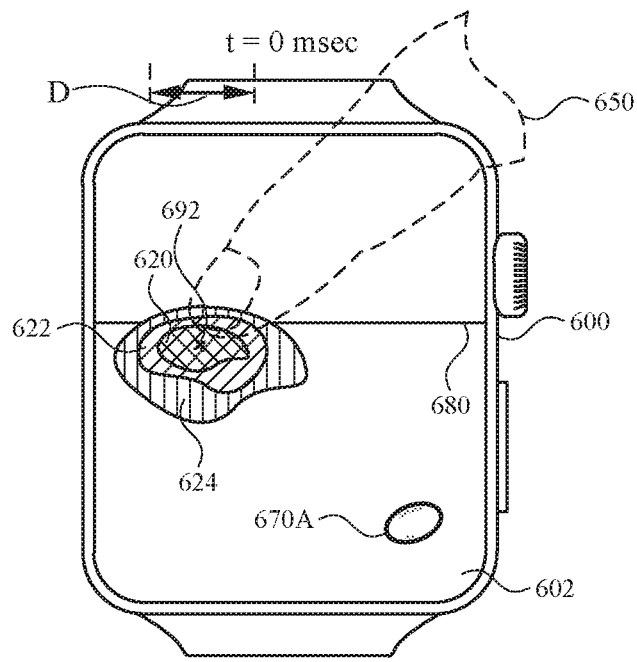
Figure 6B:
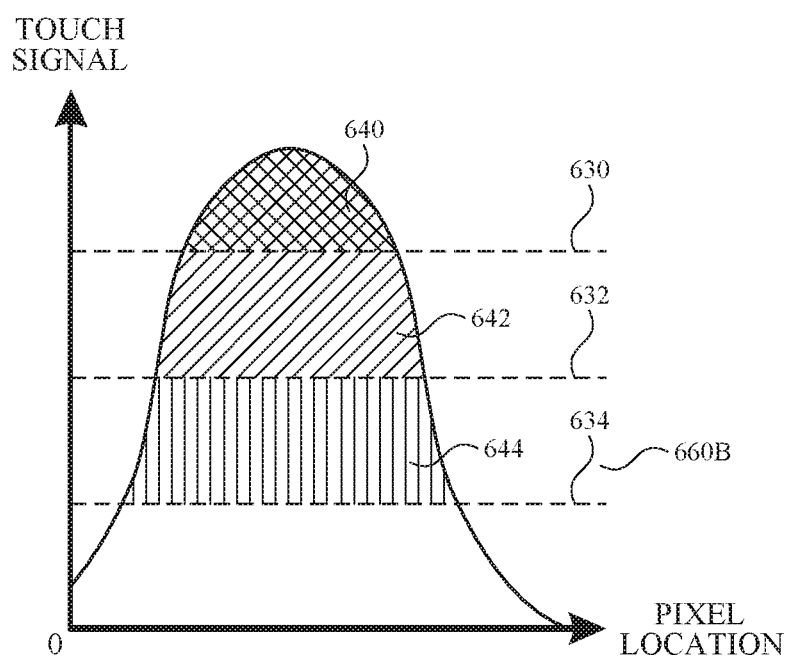

Based on the touch data (e.g., depicted in touch signal graph 660B and touch areas 620, 622, and 624) detected from finger 650 in FIG. 6B at t=0 msec, device 600 performs a number of assessments (e.g., tests) to determine if the input should be rejected as an invalid wake event input for transitioning from the powered down state (e.g., low-power state) to a higher power state (e.g., high-power state) or if the input is potentially a valid input wake event input, as discussed in more detail below.

Device 600 uses thresholds (e.g., 630, 632, and/or 634) to conserve time and power by forgoing unnecessary calculations in cases where the touch signals cannot possibly contain a touch that should transition the device 600 from powered down to powered up. For example, if none of the touch signals from the pixels on the touchscreen 602 exceed the threshold 634 (e.g., 0.5%, 15% of the maximum value that a touch signal can be on a pixel) the device forgoes doing additional unnecessary calculations (e.g., calculating diameter (e.g., diameter D in FIG. 6B) and/or position) since the device 600 will not determine that a valid touch has occurred based on these touch signals received by the pixels on the touchscreen 602.

In FIG. 6A, device 600 determines that none of the touch signals from pixels on touchscreen 602 exceed threshold 634 and, as a result, forgoes calculating the diameter of the touch from finger 650.

Thus, device 600 at time t=−∞ has not detected any touch signal and, as a result, device 600 remains in a powered down state.

In some embodiments, device 600 performs the preceding test at pre-set intervals. In some embodiments, device 600 performs the preceding test only once a signal greater than a minimum value is detected.

As shown in FIG. 6B, which occurs at time t=0 msec, finger 650 touches near the middle of touchscreen 602 such that finger 650 is positioned on top of the row of pixels 680 that are depicted on the touch signal graph 660B. Additionally, a drop of water 670A is positioned on the touchscreen 602 just below the finger 650. Touchscreen 602 of device 600 remains in the powered down state since the device 600 is still powered down.

Touch signal graph 660B provides details on the touch signals received by row of pixels 680 at time t=0 msec. Touch signal graph 660B indicates that some of the pixels in row of pixels 680 (e.g., pixels corresponding to the base of touch signal graph area 640) receive touch signals greater than threshold 630. A greater number of pixels (e.g., pixels corresponding to the base of touch signal graph area 642) receive touch signals greater than threshold 632. Finally, an even greater number of pixels (e.g., pixels corresponding to the base of touch signal graph area 644) receive touch signals greater than threshold 634.

In FIG. 6B, touch areas 620, 622, and 624 are graphical representations of the pixels on the touchscreen 602 that read a touch signal that is above the corresponding threshold 630, 632, and 634, respectively. For example, touch area 620 represents the pixels on touchscreen 602 that have a touch signal greater than the threshold 630. Touch areas 620, 622 and 624 are shown on the touchscreen 602 but are only drawn to show how the device 600 is interpreting the touch data from the touch of finger 650; touch areas 620, 622, and 624 are not displayed by the touchscreen 602 (e.g., the touchscreen 602 is powered down and remains blank as seen by the user of device 600).

Device 600 uses the touch data to test if a touch occurred by calculating the position of the touch from finger 650 on touchscreen 602. In some embodiments, device 600 determines the position of finger 650 on the touchscreen 602 by calculating the centroid 692 of the touch signals (e.g., touch signals associated with pixels in touch area 620 that have touch signals above a threshold 630) of the pixels on touchscreen 602; device 600 determines that a touch occurred if the centroid 692 calculation succeeded meaning that at least one pixel was above the requisite threshold 630 such that the centroid 692 has a position on the touchscreen 602.

In some embodiments, the centroid 692 can be defined per the following equation for all non-zero pixel sums:

$$touch_x = \sum_{i=1}^{numRows} \sum_{j=1}^{numCols} x_i I_{ij} \bigg/ \sum_{i=1}^{numRows} \sum_{j=1}^{numCols} I_{ij}$$

where $x_i$ and $y_i$ are the pixel locations, and $I_{ij}$>pixelThreshold where $I_{ij}$ is the touch signal strength at $x_i$ and $y_i$.

In FIG. 6B, device 600 determines that a touch has occurred (since centroid 692 has a position on touchscreen 602) and, as a result, does not reject the touch of finger 650 for powering up device 600. Since this is the initial time that finger 650 has touched touchscreen 602, device 600 logs the initial touchdown timestamp and the initial touchdown position of finger 650. Note that for ease of explanation this initial touch by finger 650 is defined as having occurred at time t=0 msec as depicted on FIG. 6B.

Continuing with FIG. 6B, device 600 uses the touch data to test if finger 650 is a cover touch on touchscreen 602 (e.g. a touch that covers a large area of the touchscreen) (e.g., putting palm on the device 600). Cover touches are useful for determining if a touch is a valid touch for powering up the device 600 because valid touches usually do not cover a large area of the touchscreen 602 (e.g., brushing device 600 against arm can cover a large area of the touchscreen 602, water splashing on the touchscreen 602 will often cover a large area). Device 600 tests whether a cover touch has occurred by calculating a diameter of the finger 650 touch based on touch signals on the touchscreen 602 above a threshold (e.g., threshold 632) and determining that the diameter is below a threshold indicative of a large touch. In some embodiments, the diameter of an area is calculated by first calculating the radius and multiplying it by two.

In some embodiments, the radius of an touch on a touchscreen 602 can be calculated per the following equation for all non-zero pixel sums:

$$\text{Radius}_x = \text{scaleFactor} \sqrt{\sum_{i=1}^{numRows} \sum_{j=1}^{numCols} (x_i - C_z)^2 I_{ij} \Big/ \sum_{i=1}^{numRows} \sum_{j=1}^{numCols} I_{ij}}$$

$$\text{Radius}_y = \text{scaleFactor} \sqrt{\sum_{i=1}^{numRows} \sum_{j=1}^{numCols} (y_i - C_y)^3 I_{ij} \Big/ \sum_{i=1}^{numRows} \sum_{j=1}^{numCols} I_{ij}}$$

where $x_i$ and $y_i$ are the pixel locations, $I_{ij}$>pixelThreshold, where $I_{ij}$ is the touch signal strength at the pixel located at $x_i$ and $y_i$. and pixelThreshold is a threshold (e.g., threshold 632), and the scale factor (e.g., 1.45) converts pixels to mm units. In some embodiments, the radius of the touch on touchscreen 602 is calculated based on the standard deviation of the input signals on touchscreen 602.

In FIG. 6B, device 600 determines no cover touch has occurred and, as a result, does not reject touch of finger 650 for powering up device 600.

Continuing with FIG. 6B, device 600 uses the touch data to test if touchscreen 602 is covered by too much water (e.g., above 20% of the pixels on the touchscreen 602). Device 600 determines how much of the touchscreen 602 is covered by water and determines if the calculated amount is greater than a floating water threshold that is indicative of a touch that should be rejected. In some embodiments, the extent that touchscreen 602 is covered by water is based on two signals (e.g., a bootstrapped and a non-bootstrapped signals) that, together, isolate the component of the input that corresponds to non-water based sources (e.g., finger 650). In such examples, the signal that is responsive to water (e.g., the non-bootstrapped signal) can also be used to determine the area of the touchscreen 602 that is covered by water.

In FIG. 6B, device 600 determines that drop of water 670A does not cover too much of touchscreen 602 and, as a result, does not reject the touch of finger 650 for powering up device 600.

Thus, device 600 at time t=0 msec has not rejected the touch from finger 650 but has not determined it to be a valid touch (e.g., a valid touch for transitioning from the powered down state to a higher power state). As a result, device 600 remains powered down.

Figure 6C:
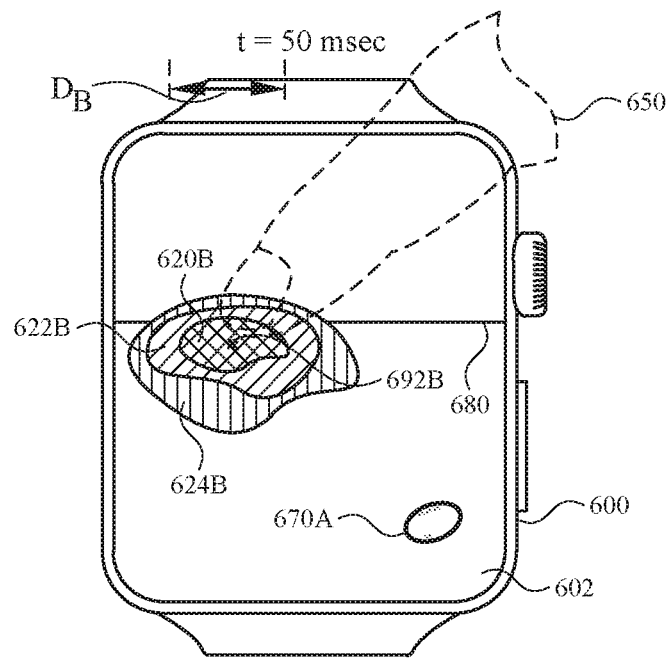
Figure 6C:
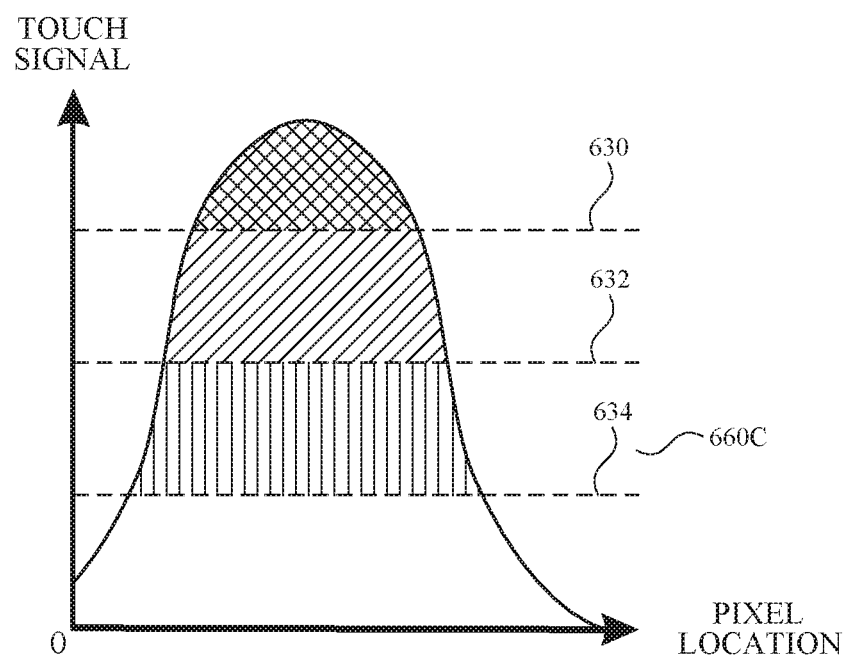

As shown in FIG. 6C, which occurs at time t=50 msec, the touch areas 620B, 622B, 624B (e.g., the pixels on touchscreen 602 that have input signals greater than thresholds 630B, 632B, and 634B, respectively) associated with finger 650 are bigger. This is a result of the finger 650 touching more of the pixels on the touchscreen 602 as the finger 650 presses more firmly on touchscreen 602. Device 600 logs the current position of the finger 650 and the current time. Touchscreen 602 of device 600 remains in the powered down state since the device 600 is still powered down.

Based on the touch data detected from finger 650 in FIG. 6C at t=50 msec, device 600 performs additional assessments to determine if the input should be rejected as an invalid wake event input for transitioning from the powered down state to a higher power state or if the input is potentially a valid input wake event input, as discussed in more detail below.

Device 600 uses the touch data to test if the diameter of the touch from finger 650 is within an allowable range (e.g., corresponding to typical finger touch sizes (e.g., 0.2 mm to 4.0 mm)). In some embodiments, device 600 calculates the diameter of the touch 650 as described above with respect to the diameter of the cover touch. Device 600 calculates the diameter of the touch from finger 650 based on touch signals above threshold 630 and determines that the diameter (depicted on FIG. 6C as $D_B$) is not within the allowed diameter range. However, before rejecting touch from finger 650 due to the diameter size, device 600 determines that the touch occurred during a hysteresis period (e.g., touch occurred at 50 msec and the hysteresis period is 100 msec). As a result, device 600 does not reject the touch from finger 650 due to the diameter of the touch from finger 650 being outside of an allowed range. This hysteresis function is present because finger 650 touches can take a small amount of time to stabilize at the beginning of a touch, for example, due to the finger 650 slightly rotating upon landing on touchscreen 602.

In FIG. 6C, device 600 does not reject the touch from finger 650 even though the diameter of the touch from finger 650 is not within an allowable range since the time since the initial touchdown of finger 650 is within the hysteresis period of 100 msec (e.g., touch duration has only been 50 msec).

Continuing with FIG. 6C, device 600 uses the touch data to test if finger 650 has drifted (e.g., movement from the initial touchdown position) beyond an allowable range. Device 600 calculates the distance that the touch from finger 650 has moved based on the current position of the touch from 650 and the initial touchdown position. Device 600 compares the distance to a drift threshold to determine if finger 650 has drifted beyond an allowed range (e.g., 1.0 mm). Device 600 determines how much drift occurs because touches that drift too far are usually not the result of a valid touch for powering up the device 600 (e.g., the user intended to swipe or the touch was the result of an unintentional brushing of the arm over the device 600).

In FIG. 6C, finger 650 has not moved from the initial touchdown position so device 600 detects no drift from the touch of finger 650 on touchscreen 602 and, as a result, does not reject the touch of finger 650 for powering up device 600.

Thus, device 600 at time t=50 msec has not rejected the touch from finger 650 but has not determined it to be a valid touch. As a result, device 600 remains powered down.

Figure 6D:
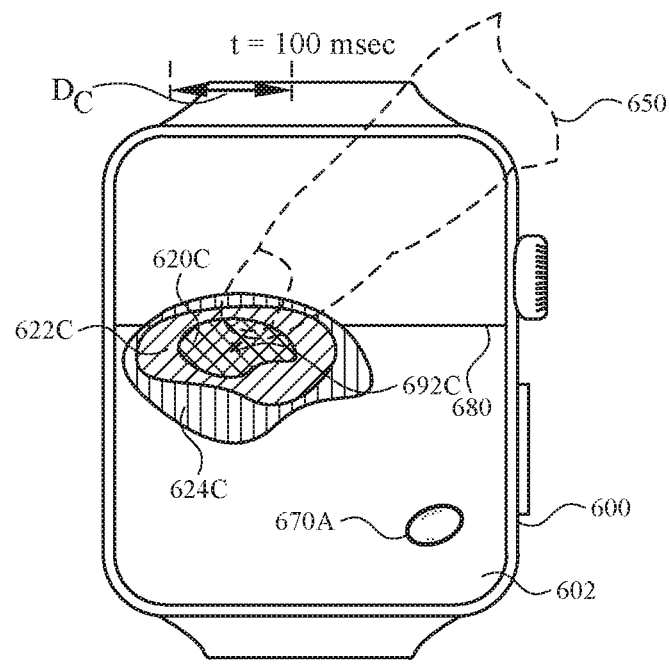
Figure 6D:
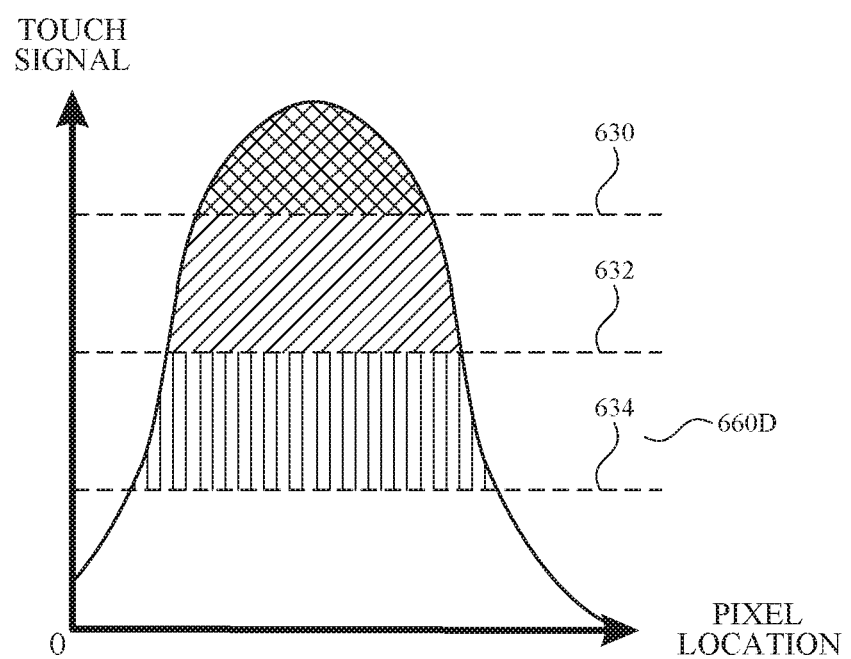

As shown in FIG. 6D, which occurs at time t=100 msec, the touch areas 620C, 622C, 624C associated with finger 650 are bigger. This is a result of the finger 650 touching more of the pixels on the touchscreen 602 as the finger 650 continues to press more firmly on touchscreen 602. Device 600 logs the current position of the finger 650 and the current time. Touchscreen 602 of device 600 remains in the powered down state since the device 600 is still powered down.

Based on the touch data detected from finger 650 in FIG. 6D at t=100 msec, device 600 performs a number of additional assessments (e.g., tests) to determine if the input should be rejected as an invalid wake event input for transitioning from the powered down state to a higher power state or if the input is potentially a valid input wake event input, as discussed in more detail below.

Device 600 uses the touch data to again test if the diameter of the touch from finger 650 is within an allowable range. Device 600 calculates the diameter (depicted on FIG. 6D as $D_C$) of the touch from finger 650 using touch signals greater than threshold 630. Device 600 compares the calculated diameter with an allowed diameter range.

In FIG. 6C, device 600 determines that finger 650 has a diameter that is within an allowable diameter and, as a result, does not reject the touch of finger 650 for powering up device 600.

Continuing with FIG. 6D, device 600 uses the touch data to test if the duration of time that the touch from finger 650 has touched touchscreen 602 (e.g., touch duration) is within an allowable range. Device 600 determines the touch duration because valid touches are usually within some reasonable time duration (e.g., minimum duration=10 msec, maximum duration=1500 msec). Device 600 determines the touch duration by calculating the difference between the current time (e.g., time associated with t=100 msec) and the initial touchdown timestamp. Device 600 compares the touch duration to a range of allowable touch durations.

In FIG. 6D, device 600 determines that finger 650 touch is not outside an allowable touch duration range and, as a result, does not reject the touch of finger 650 for powering up device 600.

Thus, device 600 at time t=100 msec has not rejected the touch from finger 650 but has not determined it to be a valid touch. As a result, device 600 remains powered down.

Figure 6E:
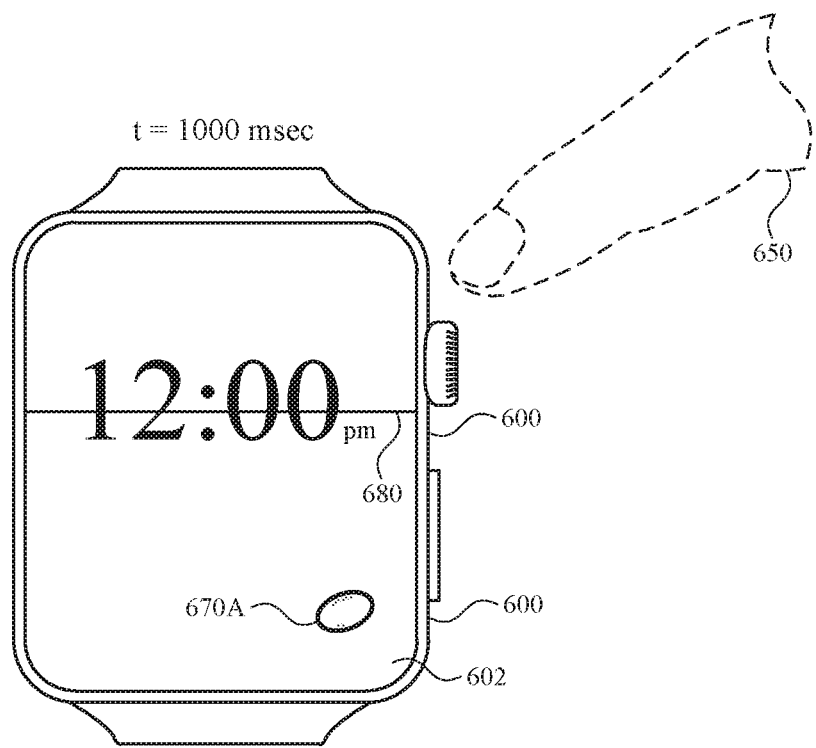
Figure 6E:
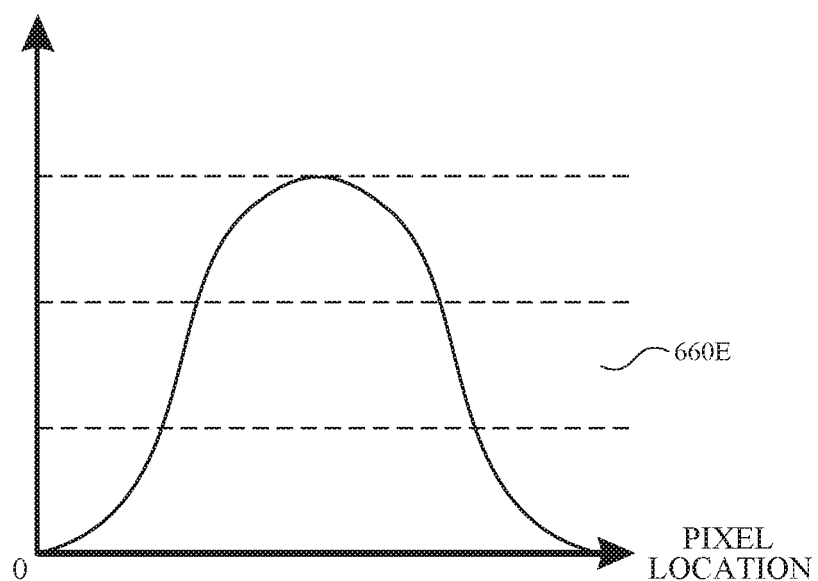

As shown in FIG. 6E, which occurs at time t=1000 msec, the finger 650 has lifted off of the touchscreen 602. The device 600 determines that finger 650 is no longer touching the device. Further, device 600 has never rejected the touch from finger 650 throughout the touch. As a result, device 600 powers up (e.g., transitions from a low-power state to a high-power state). Device 600 displays the current time of 12:00 pm to the user, which is indicative of touchscreen 602 having transitioned from a low-power state to a high-power state.

In some embodiments, a test for rejecting a touch from transitioning device 600 from a lower-power state to a high-power state must never fail for the duration of the entire touch. For example, a cover touch must never have occurred. In some embodiments, a test is used to determine that the start of the touch from finger 650 has occurred. For example, the diameter (e.g., D, $D_{D1}$, $D_{D2}$) of the touch from finger 650 must be within an allowable range indicative of a touch from a human finger. In some embodiments, a test is used at liftoff of finger 650 from touchscreen 602 (e.g., but not at touchdown of finger 650). For example, too much floating water must not be present at the time device 600 determines that finger 650 no longer makes contact with touchscreen 602.

The previous set of figures (FIGS. 6A-6D) illustrated exemplary devices and methods for ensuring that valid touches are accepted. Similarly, device 600 ensures that invalid touches are rejected. FIGS. 6F-6J illustrate exemplary devices and methods for ensuring that an invalid touch (e.g., water contact on the touchscreen) is rejected.

Figure 6F:
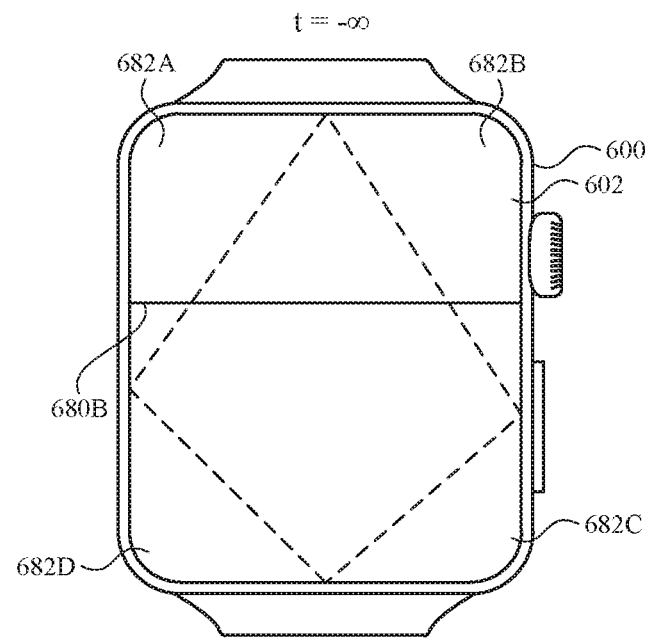
FIGS. 6F-6J illustrate exemplary devices and methods for ensuring that an invalid touch for powering up an electronic device is rejected.
Figure 6F:
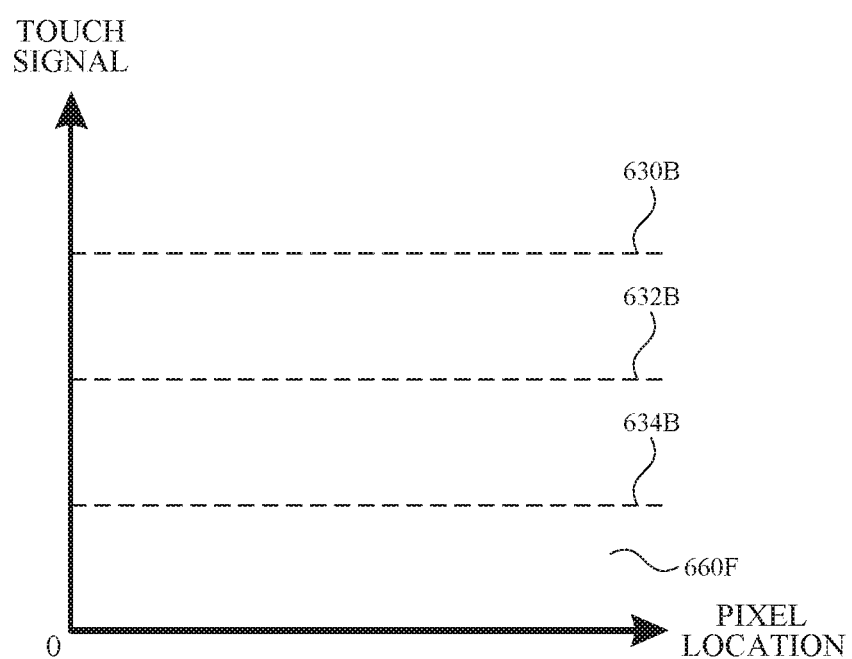

As shown in FIG. 6F, no water has contacted the touchscreen 602 and device 600 is in a low-power state with touchscreen 602 operating in a minimal power state (e.g., a powered down state for at least the touchscreen 602). FIG. 6A is labeled with a time of t=−∞ to indicate that no touch has occurred, with t=0 msec representing the time when the device 600 first detects touch signals that the device 600 determines could potentially be a valid touch.

FIG. 6F also includes touch signal graph 660F, which depicts the touch signal strength of each pixel in a row of pixels 680B horizontally spaced across touchscreen 602 (e.g., the row of pixels 680B represents a cross section of touchscreen 602). Touch signal graph 660F indicates that no pixel in the row of pixels 680B on the touchscreen 602 detects a touch signal value greater than 0.

Deadzone regions 682A, 682B, 682C, and 682D are triangular areas in the corners of the touchscreen 602 bounded by the edges of device 600 and a dotted line. Touches outside of any deadzone regions 682A, 682B, 682C, and 682D are more likely (e.g., based on empirical observations and human physiology) to be due to valid touches for transitioning the device 600 from a low-power to a high-power state, as compared to touches in deadzone regions. In contrast, a user is less likely to touch device 600 on the edge or in the corner of the touchscreen 602 (e.g., in a deadzone region (e.g., 682A, 682B, 682C, and 682D) to transition the device 600 from a powered down to a powered up state. In some embodiments, the deadzone regions 682A, 682B, 682C, and 682D are rectangular areas at the edges of the touchscreen 602. In some embodiments, the deadzone regions 682A, 682B, 682C, and 682D are asymmetrical to handle situations where the probability of valid user touches varies asymmetrically due to factors like the handedness of the user (e.g., left or right-handed).

Figure 6G:
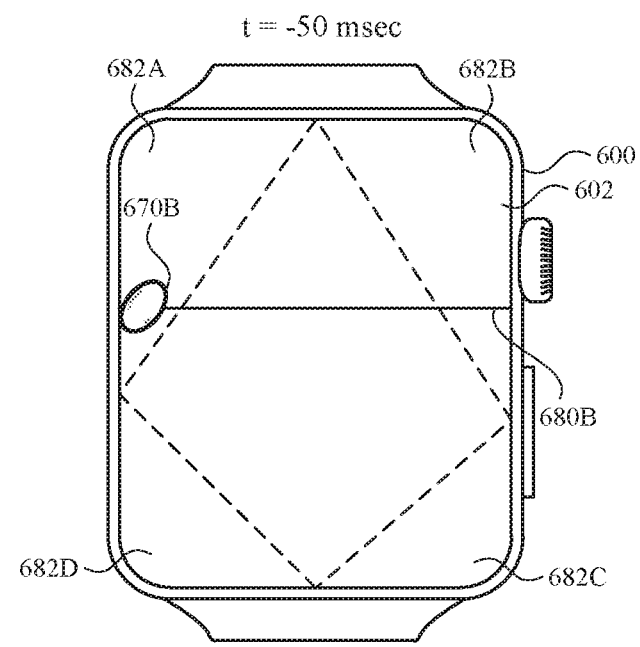
Figure 6G:
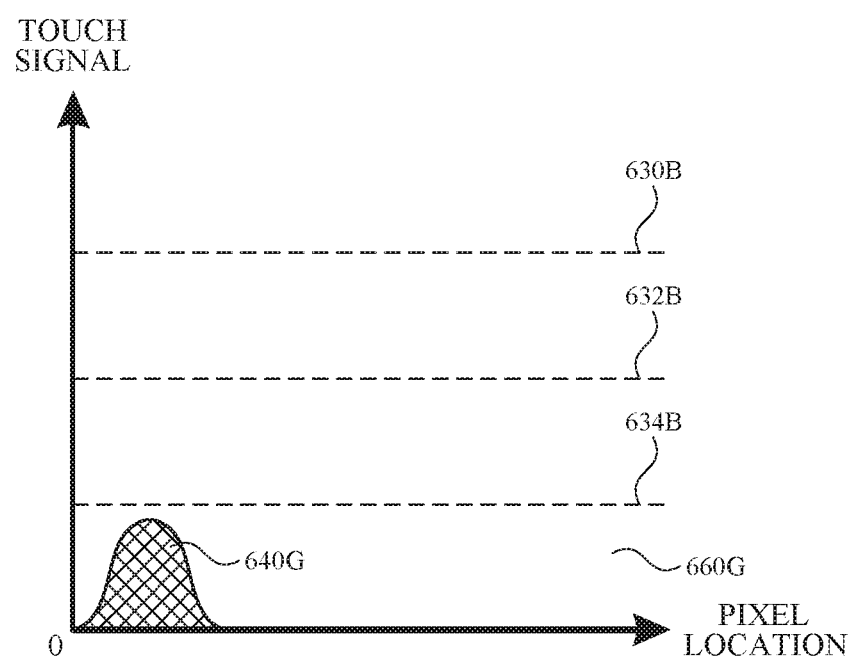

As shown in FIG. 6G, which occurs at time t=−50 msec (e.g., 50 msec before a potentially valid touch occurs) drop of water 670B is positioned on touchscreen 602 and pixels in row of pixels 680B. Touchscreen 602 of device 600 remains in the powered down state since the device 600 is still powered down.

Touch signal graph 660G indicates that no touch signal in the row of pixels 680B has a value over the threshold 634B as indicated by touch signal graph area 640G. Threshold 634B is set such that if no touch signal on touchscreen 602 is greater than the threshold 634B, then device 600 forgoes doing any additional unnecessary calculations (e.g., calculating diameter (e.g., D, $D_{D1}$, $D_{D2}$) and/or position) since the touch signals cannot possibly contain a touch that should transition the device 600 from powered down to powered up.

In FIG. 6F, no pixel on the touchscreen 602 has a touch signal value over the threshold 634B. Thus, device 600 forgoes doing any additional unnecessary calculations.

Thus, device 600 at time t=−50 msec has not detected a touch signal that it has determined could potentially be a valid touch for powering up and, as a result, device 600 remains in a powered down state.

Figure 6H:
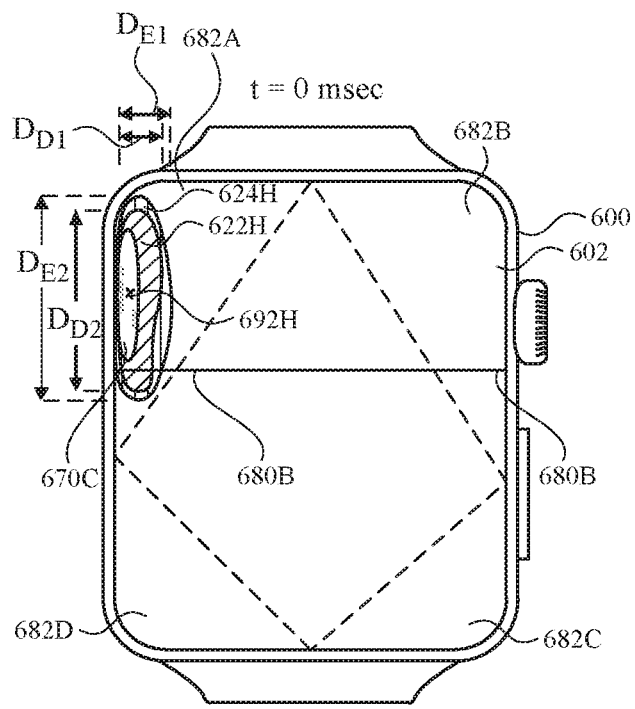
Figure 6H:
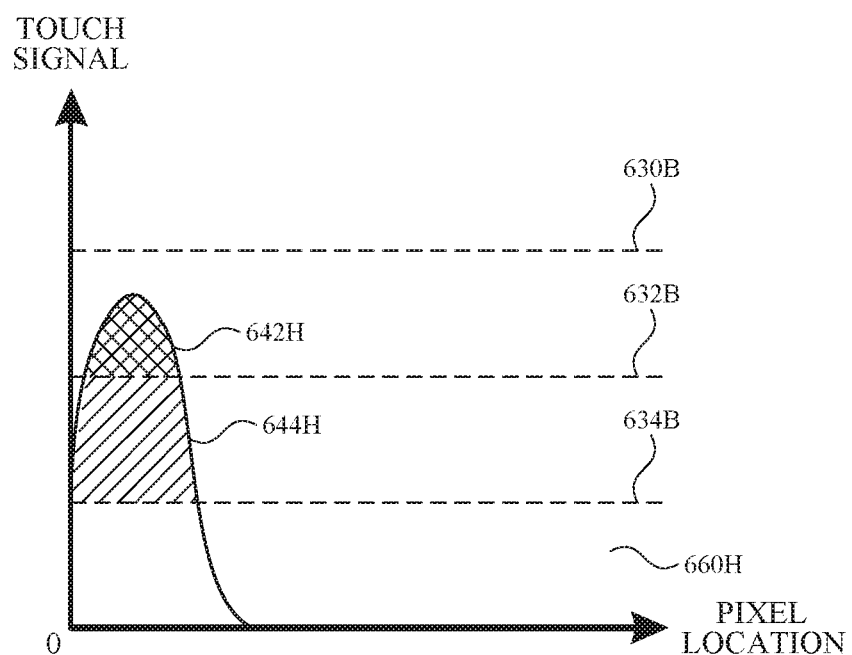

As shown in FIG. 6H, which occurs at time t=0 msec, a much larger drop of water 670C is positioned on touchscreen 602 and pixels in row of pixels 680B. The drop of water 670C is positioned on the edge of the touchscreen 602 in deadzone area 682A. The drop of water 670C is narrow horizontally (e.g., a few pixels wide), but much longer vertically. Touchscreen 602 of device 600 remains in the powered down state.

In FIG. 6H, touch areas 622H and 624H are graphical representations of the pixels on the touchscreen 602 that read a touch signal that is above the corresponding threshold 632B and 634B, respectively. Touch areas 622H and 624H are shown on the touchscreen 602 but are only drawn to show how the device 600 is interpreting the touch data from the touch of drop of water 670C; touch areas 622H and 624H are not displayed by the touchscreen 602 (e.g., the touchscreen 602 is powered down and remains blank as seen by the user of device 600).

Based on the touch data (e.g., depicted in touch signal graph 660H and touch areas 622H and 624H) detected from drop of water 670C in FIG. 6H at t=0 msec, device 600 performs a number of assessments (e.g., tests) to determine if the input should be rejected as an invalid wake event input for transitioning from the powered down state to a higher power state or if the input is potentially a valid input wake event input, as discussed in more detail below.

Device 600 uses the touch data to test if the diameter of the touch from drop of water 670C is within an allowable range (e.g., corresponding to typical finger touch sizes (e.g., 0.2 mm to 4.0 mm)). Device 600 calculates the diameter of the touch from drop of water 670C in the x and y-dimensions (depicted on FIG. 6H as $D_{D1}$ and $D_{D2}$) based on touch signals on the touchscreen 602 above threshold 632B. Device 600 compares the diameters in the x and y-dimensions to an allowable range for touch diameters.

In FIG. 6H, device 600 detects that both the diameter in the x-dimension and the diameter in the y-dimension are outside of an allowable range for diameters (e.g., a diameter rejection event has occurred). Device 600 determines that the diameter in the x-dimension (e.g., $D_{D1}$) is outside the allowed diameter range since it is too narrow. Device 600 determines that the diameter in the y-dimension (e.g., $D_{D2}$) is outside the allowed diameter range since it is too long. As such, device 600 logs that a diameter event has occurred.

In some embodiments, device 600 immediately rejects the touch because of the diameter event. In some embodiments, device 600 only rejects the touch if the diameter event occurs after a predetermined hysteresis time (e.g., 100 msec). In some embodiments, the diameter of the touch from drop of water 670C being within an allowed range (e.g., a range typically found by a finger input) triggers the device to determine that a potentially valid touch has occurred (as represented by time t=0 msec in the current set of figures).

Continuing with FIG. 6H, device 600 uses the touch data to test if drop of water 670C is a cover touch on touchscreen 602 (e.g., a touch that covers a large area of the touchscreen) (e.g., putting palm on the device 600). Device 600 determines whether the touch from drop of water 670C has caused a cover touch to occur (e.g., cover touch event) by calculating a diameter of the drop of water 670C based on touch signals on the touchscreen 602 above a threshold (e.g., threshold 634B) and determining whether the diameter is above a threshold indicative of a large touch.

In the embodiment of FIGS. 6F-6J, device 600 detects that a cover touch has occurred based on the diameter (e.g., a diameter calculated based on threshold 634B results in a diameter $D_{E2}$ that is greater than an allowed size for a cover touch). As such, device 600 logs that a cover touch event has occurred.

In some embodiments, device 600 immediately rejects the touch because of the cover event. In some embodiments, device 600 rejects the cover event only after a touch is no longer detected (e.g., at finger liftoff or when the water is no longer touch touchscreen 602).

Continuing with FIG. 6H, device 600 uses the touch data to test if the touch from drop of water 670C on touchscreen 602 is within a deadzone region (e.g., 682A, 682B, 682C, or 682D). Device 600 determines touch from drop of water 670C is within a deadzone region by calculating the position of the touch from drop of water 670C (e.g., centroid 692H position) and then determining whether the position is within the bounds of any of the deadzone regions 682A, 682B, 682C, or 682D.

In FIG. 6H, device 600 detects that touch from drop of water 670C is within deadzone region 682A (e.g., deadzone event). In some embodiments, device 600 immediately rejects the touch because of the deadzone event. In some embodiments, device 600 rejects the deadzone event only after a touch is no longer detected (e.g., at finger liftoff or when the water is no longer touch touchscreen 602).

Usually touches within deadzone regions (e.g., 682A, 682B, 682C, and 682D) are not the result of a valid touch for transitioning from the powered down state to a higher power state. However, touches in these deadzone regions (e.g., 682A, 682B, 682C, and 682D) that pass additional assessments are usually the result of valid touches. For example, touches in deadzone regions (e.g., 682A, 682B, 682C, and 682D) that result in at least one pixel having a touch signal above a deadzone threshold (e.g., 80% of maximum touch signal value for a pixel) are usually the result of a valid touch.

Device 600 uses the touch data to test if the touch from drop of water 670C causes at least one pixel to have a touch signal greater than the deadzone threshold.

In FIG. 6H, device 600 has detected that the touch from drop of water 670 is within deadzone region 682A, however, device 600 determines that no pixel on touchscreen 602 has a touch signal greater than deadzone threshold (e.g., weak touch in deadzone event has occurred). As such, device 600 logs that a weak touch in deadzone event has occurred.

In some embodiments, if device 600 detects a touch having a characteristic intensity above a predetermined intensity value (e.g., detected at the contact intensity sensors), the touch is characterized as a wake event and device 600 responds by transitioning from the low power state to the higher power state.

Continuing with FIG. 6H, device 600 uses the touch data to test if the extent of the touchscreen 602 area covered by water due to drop of water 670C on touchscreen 602 is beyond an allowable threshold (e.g., 20% of the pixels of touchscreen 602) (e.g., a floating water event has occurred). Device 600 calculates the extent of the touchscreen 602 area that is covered by water and compares the result with a floating water threshold.

In FIG. 6H, device 600 determines that the extent of water on touchscreen 602 is greater than the floating water threshold such that a floating water event has occurred. Device 600 logs that a floating water event has occurred. As such, device 600 logs that a floating water event has occurred.

In some embodiments, device 600 immediately rejects the touch because of the floating water event. In some embodiments, device rejects the touch only after a touch is no longer detected (e.g., at finger liftoff or when the water is no longer touching touchscreen 602).

Continuing with FIG. 6H, device 600 uses the touch data to test if the touch from drop of water 670C on touchscreen 602 is shaped thin (e.g., diameter of touch in only one dimension is below a thin threshold) in one-dimension only and comprised of touch signal indicative of a strong touch (e.g., at least one pixel on the touchscreen has a touch signal that exceeds a strong touch threshold indicative of a strong touch). Touches along the edge of the touchscreen are usually not the result of a valid touch and should be rejected (e.g., grounded drops of water along the edge). However, a user may touch the edge of touchscreen 602 intending to power on the device 600. Unfortunately, a valid user touch on the edge may be narrow in one dimension as a result of having occurred on the edge of the touchscreen 602. To reduce the chance of a valid input being rejected improperly, device 600 determines if a touch on touchscreen 602 is thin and strong. Device 600 calculates the diameter of the touch from drop of water 670C and compares the diameter of the touch from drop of water 670 in both the x and y-dimensions to a thin threshold indicative of the touch being narrow (e.g., 0.3 mm). Device 600 also determines whether any pixel on touchscreen 602 has a touch signal greater than a strong touch threshold indicative of a strong touch (e.g., 80% of maximum touch signal for pixel).

In FIG. 6H, the device 600 determines that the touch from drop of water 670C is thin only in the x-dimension but that a strong touch did not occur. As such, device 600 logs that a thin weak touch event occurred.

In some embodiments, device 600 determines that a thin weak touch event has occurred when, for a thin touch, no contact intensity sensor on touchscreen 602 has a contact intensity value greater than a strong intensity threshold indicative of a strong touch. In some embodiments, device 600 immediately rejects the touch due to the thin weak touch event. In some embodiments, device 600 only rejects the touch if the thin weak touch event occurs when the touch is no longer detected. In some embodiments, a strong touch on touchscreen 602 that occur along with a thin shaped touch triggers the device to determine that a potentially valid touch has occurred (e.g., as represented by time t=0 msec in the current set of figures).

Thus, device 600 at time t=0 msec has not rejected the touch from drop of water 670C but has not determined it to be a valid touch. As a result, device 600 remains powered down.

Figure 6I:
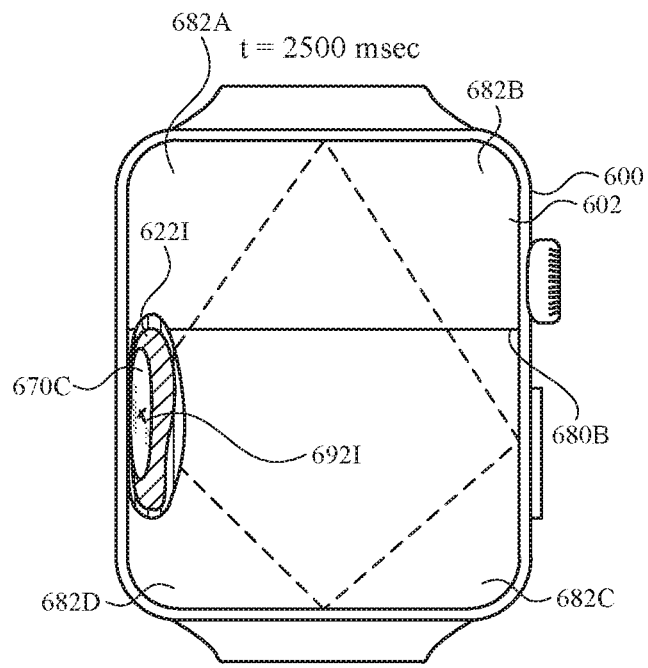
Figure 6I:
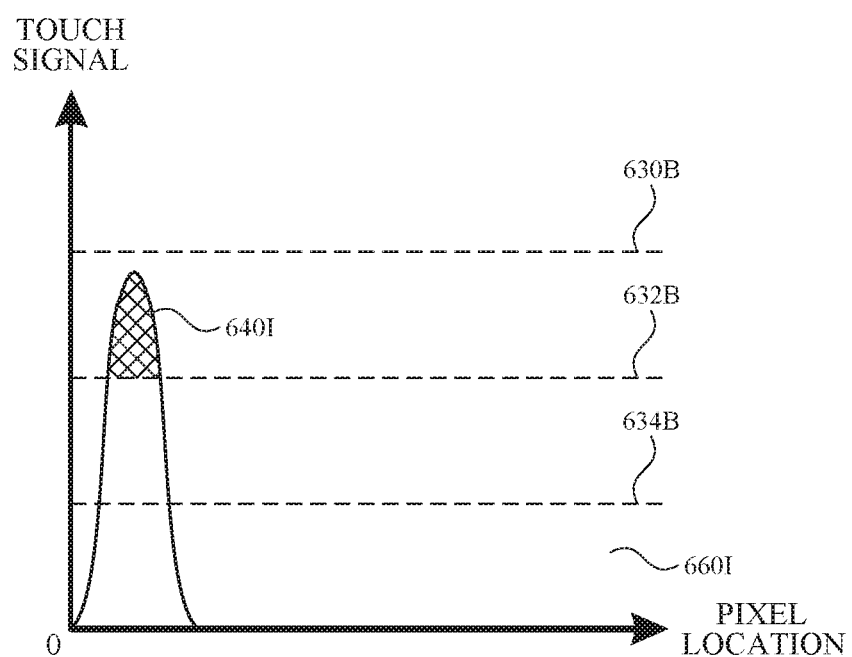

As shown in FIG. 6I, which occurs at time t=2500 msec, drop of water 670C is positioned on the edge of the touchscreen 602 of device 600 (perhaps due to gravitational effects due to the rotation of device 600) below where drop of water 670C on FIG. 6H is positioned. Touch area 622I is not shown on the touchscreen 602 and is instead only drawn to show how the device 600 is interpreting the touch data from the touch of drop of water 670C.

Based on the touch data (e.g., depicted in touch signal graph 660I and touch area 622I) detected from drop of water 670C in FIG. 6I at t=2500 msec, device 600 performs additional assessments (e.g., tests) to determine if the input should be rejected as an invalid wake event input for transitioning from the powered down state to a higher power state or if the input is potentially a valid input wake event input, as discussed in more detail below.

Device 600 uses the touch data to test if the touch from drop of water 670C has moved beyond an allowable distance from its initial touchdown position. Device 600 determines the position of the touch from drop of water 670C on touchscreen 602 (e.g., by calculating the centroid 692I). Device 600 compares the current position of drop of water 670C with the initial touchdown position logged at time t=0 msec to calculate the distance the drop of water 670C has moved.

In FIG. 6I, device 600 determines that the distance the drop of water 670C has moved exceeds an allowed distance. Device 600 logs that the drop of water 670C has exceeded the allowed distance value for movement (e.g., a touch movement event has occurred). In some embodiments, device 600 immediately rejects the touch due to the touch movement event. In some embodiments, device 600 rejects the touch movement event only after a touch is no longer detected (e.g., at finger liftoff or when the water is no longer touching touchscreen 602).

Continuing with FIG. 6I, device 600 calculates the duration of the touch by comparing the current time with the initial touchdown timestamp that was logged at time t=0 msec. Device 600 compares the duration of the touch versus a range of allowable touch durations. The range of allowable touch durations is a predetermined range of time found empirically to bound the durations of touches that are likely valid touches for powering up the device 600.

In FIG. 6I, device 600 determines that the drop of water 670C touched device 600 beyond the allowed duration range (e.g., 2500 msec>1500 msec upper range value allowed for a touch). Device 600 logs that drop of water 670C has exceeded the allowed duration for a touch to power up device 600 (e.g., duration exceeded event).

Thus, device 600 at time t=2500 msec has not rejected the touch from finger 650 but has not determined it to be a valid touch. As a result, device 600 remains powered down.

Figure 6J:
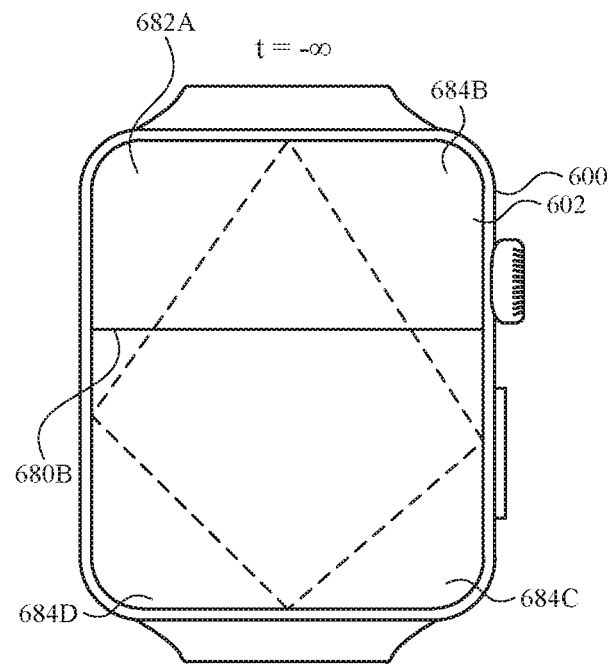
Figure 6J:
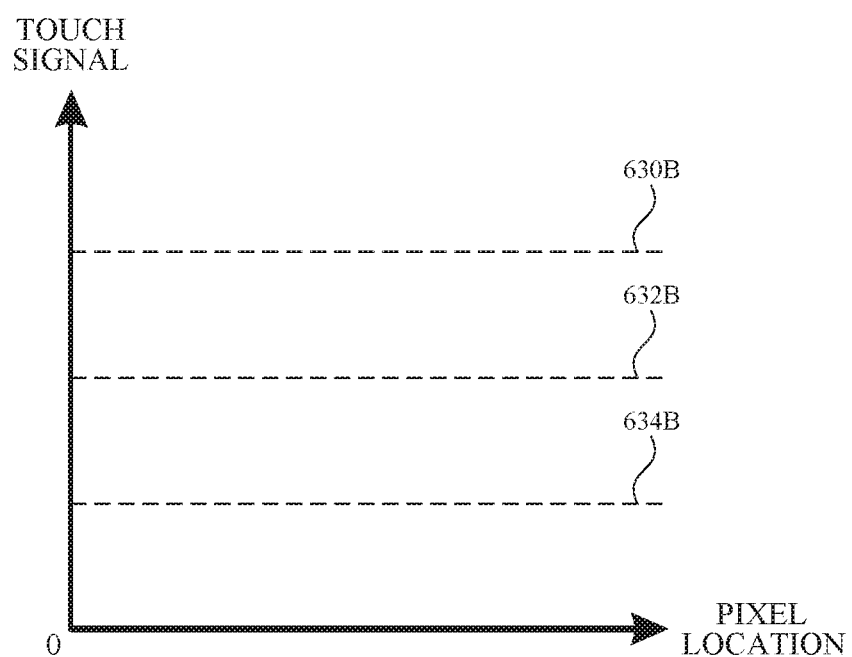

As shown in FIG. 6J, which occurs at time t=3000 msec, drop of water 670C is no longer on touchscreen 602 of device 600 (perhaps, once again, due to the gravitational effects due to the rotation of device 600). Touch signal graph 660J indicates that no pixels in row of pixels 680B has a touch signal over threshold 630B. As a result, device 600 determines that there is no contact on touchscreen 602 (e.g., liftoff of the touch has occurred).

As a result of device 600 no longer detecting a touch, device 600 determines that a liftoff has occurred. Device 600 determines whether to transition from a powered down state to a powered up state based on whether any criteria for rejection has occurred during the touch (e.g., from time t=0 to t=3000 msec). In the embodiment of FIGS. 6F-6J, device 600 determines that the touch from drop of water 670C has failed numerous tests: a diameter event has occurred (e.g., a diameter of the touch is outside an allowed range), a duration exceeded event has occurred (the duration of the touch was outside the allowed range of allowable touch durations), a touch movement event has occurred (e.g., the touch moved too far from the initial touchdown position), a cover event has occurred (e.g., at least one dimension of the duration of the touch area exceeds an allowed threshold), floating water event has occurred (e.g., too many pixels on touchscreen 602 are covered with water) a weak touch in deadzone event has occurred (e.g., a touch occurred in a deadzone but at a touch signal strength too low to be considered a valid touch), and a thin weak touch event occurred (e.g., a thin touch with a weak touch signal). In the embodiment of FIGS. 6F-6J, if device 600 determines that any one of the above tests is not successfully met, the touch is rejected and the device remains in a low power state. In some embodiments, a predetermined number of tests must not be successfully met for the device to reject the touch and remain in a low power state. Thus, device 600 at time t=3000 msec has rejected the touch from drop of water 670C. As a result, device 600 remains powered down.

Figure 6K:
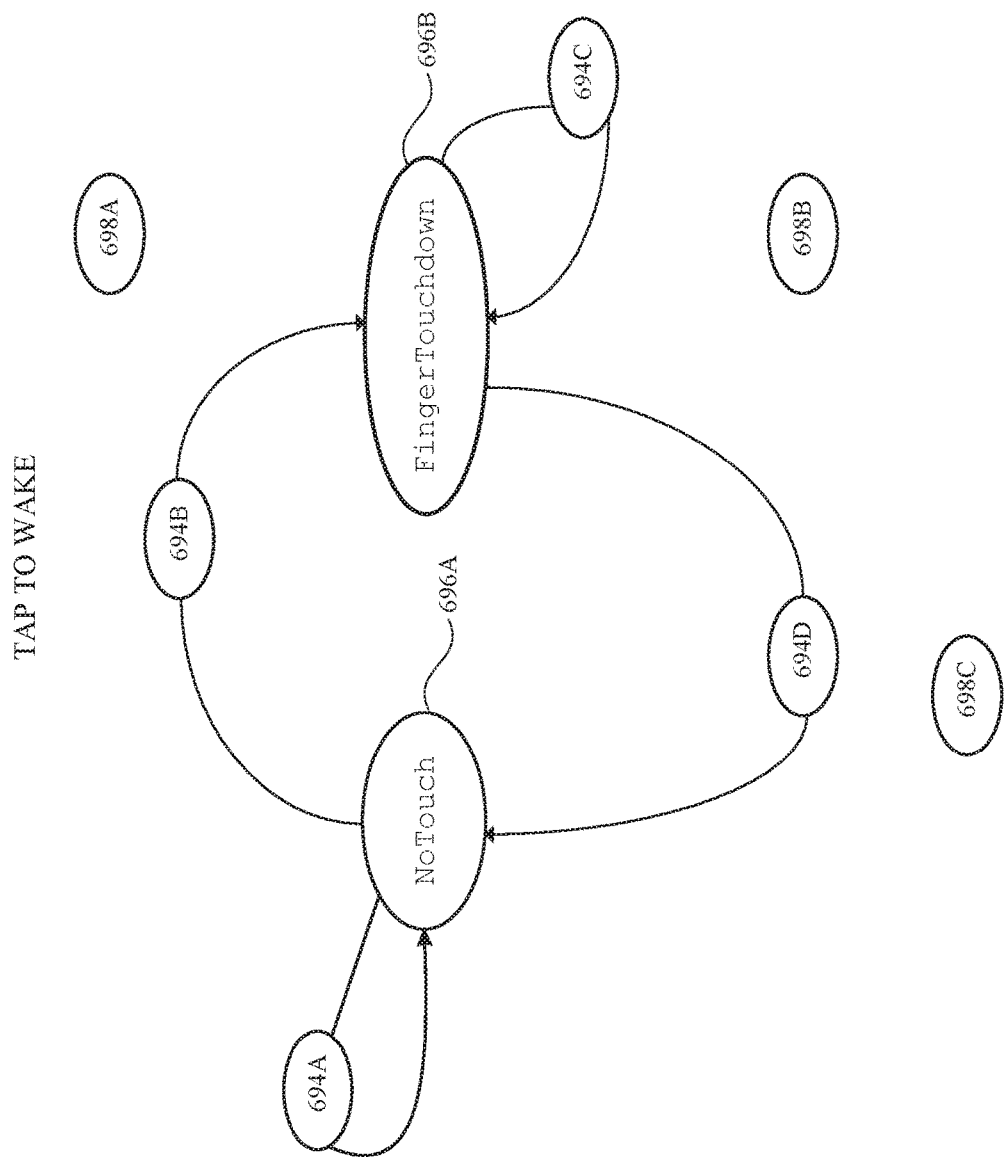
FIG. 6K illustrates an exemplary state diagram for a method of ensuring that an invalid touch for powering up an electronic device is rejected.

In an embodiment shown in FIG. 6K, device 600 determines whether to power up using a state engine with two states: NoTouch 696A and FingerTouchdown 696B states. Before finger 650 touches the touchscreen 602 (e.g., as in FIG. 6A), the state engine is in the NoTouch state. As shown in action 694A, device 600 clears a COVER flag, which when set indicates that a cover touch has occurred at some point in time since the flag was cleared. As shown in action 694B (e.g., FINGER), when finger 650 touches the touchscreen 602, device 600 determines whether the touch has features that are representative of a finger touch, such as the diameter size being within an allowed range (or, for thin touches, a touch signal above a threshold). Once device 600 determines that finger 650 touch has a diameter within an allowed range (as in FIG. 6D), device 600 records the touchdown timestamp and the touchdown position. Additionally, device 600 determines whether a cover touch has occurred (e.g., from too much water being on the touchscreen 602) and sets the COVER flag if a cover touch has occurred. Device 600 transitions the state machine from the NoTouch 696A to the FingerTouchdown 696B state. As shown in action 694C, in the FingerTouchdown 696B state, device 600 executes a hysteresis loop in which the state machine stays in the FingerTouchdown 696B state if a touch has features representative of a finger 650 touch (e.g., FINGER) (e.g., touch diameter within range typical of finger sizes). Additionally, the state machine stays in the Finger-Touchdown 696B state if, after a hysteresis time (e.g., 100msec), device 600 determines that a touch is present but that the touch no longer has features representative of a finger 650 touch (e.g., touch diameter out of range typical of finger sizes). While in the FingerTouchdown 696B state device 600 logs the current position and time and determines if any cover touches have occurred. Device 600 sets the COVER flag if any cover touches occur. The purpose of the hysteresis in this embodiment is to allow slow finger 650 swipes. Often with a finger 650 swipe, the diameter of the finger 650 falls outside the allowed finger 650 diameter range during parts of the swipe. Without the hysteresis function the diameter falling outside of the allowed range would abort the intended swipe and cause device 600 to transition from the FingerTouchdown 696B state back to NoTouch 696A state and potentially cause the device 600 to power up. When device 600 detects no touch by finger 650 (as in FIG. 6E), device 600 transitions from the Finger-Touchdown 696B state back to the NoTouch 696A state. As shown in action 694D, during this transition between states, device 600 transitions to a powered up state if the finger 650 touched the touchscreen 602 within the allowed duration, finger 650 did not move too far from the initial touchdown position, there was never a cover touch (as indicated by COVER flag never being set), and finger 650 was not too close to the edge of the touchscreen 602. A table mapping selected reference elements in FIG. 6K to what the reference element represents is presented in Table A below.

TABLE A

Reference Elements Meaning for FIG. 6K.

| Reference Element | Meaning |
|---|---|
| 694A | clear COVER flag in coverAtAnyTime |
| 694B | FINGER/ record touchDownTimeStamp_ms, record touch down position, coverAtAnyTime !=COVER |
| 694C | FINGER \|\| (TOUCH && t-touchdown >100 ms)/ update position, coverAtAnyTime != COVER |
| 694D | else Send Wake-On-Touch event if (gTapToWakeMinDuration < timestamp_ms - touchDownTimeStamp_ms < gTapToWakeMaxDuration [0 to 2.5 s]) AND touchDrift = \|position − touchDownPosition\| <1.0 mm AND NOT coverAtAnyTime AND touch position not past the edge in this frame |
| 698A | FINGER TOUCH DOWN IN THE MIDDLE (OR POSSIBLY A WEAK OR GLANCING COVER TOUCH). RECORD THE TIME AND TOUCHDOWN POSITION, AND WHETHER WE HAD A COVER |

TABLE A-continued

Reference Elements Meaning for FIG. 6K.

| Reference Element | Meaning |
|---|---|
| 698B | FOR HYSTERESIS, LOOP BACK TO TOUCHDOWN STATE AFTER 100 MS HAS PASSED SINCE FIRST TOUCHDOWN IF EITHER A TOUCH OR A FINGER IS PRESENT. UPDATE THE POSITION, AND WHETHER WE HAD A COVER AT ANY TIME. |
| 698C | ISSUE A TAP EVENT FLAG IF . . . WE HAVE TAP DURATION NOT TOO LONG OR TOO SHORT (TIME OUT FOR FINGER HOLD). WE DIDN'T DRIFT TOO FAR FROM THE TOUCHDOWN POSITION (TO AVOID SWIPES FROM TRIGGERING WOT). WE NEVER HAD A COVER DURING THIS TIME (REJECT ANY INTERMITTENT COVERS DURING THE TAP). FINGER DIDN'T SLIDE OFF THE EDGE. |

FIGS. 7A-7D illustrate a flow diagram illustrating a method for rejecting touches to an electronic device that are false positives and would result in an unintended waking of the electronic device using an electronic device in accordance with some embodiments.

As described below, the method 700 provides an intuitive for rejecting touches to an electronic device that are false positives for transitioning the device from a low-power state to a high-power state. For battery-operated computing devices, rejecting touches to an electronic device that are false positives for transitioning the device from a low-power state to a high-power state more efficiently conserves power and increases the time between battery charges.

As shown in block 702, method 700 is performed at an electronic device (e.g., 100, 300, 500, 600), having a display (e.g., 602) and a touch-sensitive surface, (e.g., 522, 602, a multi-touch touch panel or touchscreen, a capacitive touch panel or touchscreen, a mutual capacitive touch panel or touchscreen) (in some examples, the touch-sensitive surface is substantially transparent and overlays the display to form a touch-sensitive display) (in some examples, the touch-sensitive surface is separate from the display) includes an array of touch pixels, the array of touch pixels including one or more margin regions and one or more non-margin regions. Some operations in method 700 are, optionally, combined, the orders of some operations are, optionally, changed, and some operations are, optionally, omitted.

In some examples, at block 702, the one or more margin regions (e.g., 682A, 682B, 682C, 682D) includes a first margin region (e.g., 682A) that is adjacent to (e.g., touches, borders, includes the edge-most touch pixels) at least one edge of the touch-sensitive surface. In some examples, the electronic device includes a single margin region that includes all of the edge-most touch pixels of the touch-sensitive surface. In some such examples, the single margin region also includes touch pixels that are adjacent to the edge-most touch pixels, such that the margin region is more than one touch pixel wide. In some examples, the touch-sensitive surface is a rectangular surface with the margin region being a border formed by the outer-edge of the touch-sensitive surface.

In some examples, at block 704, the touch sensitive surface (e.g., 602) includes one or more corner areas (e.g., 682A, 682B, 682C, 682D, the area that is adjacent to and includes a geometric vertex) (in some examples, the surface is a rectangle, parallelogram, or a triangle), and the one or more margin regions include a second margin region (e.g., 682A) that includes at least one corner area of the touch-sensitive surface. In some examples, the surface is a rectangular touch-sensitive surface (e.g., 602) that includes four corner areas and the surface includes four discrete margin regions, each including one of the corner areas. In some such examples, each margin region is shaped as a right triangle (e.g., right-angled triangle) having its right angle vertex at the corresponding vertex of the surface. In some examples, the corner areas of the surface are empirically the areas of the surface that are least likely to receive valid user finger inputs. In such examples, inputs in the corner areas are more likely to be false-positives, from an empirical perspective.

In some examples, at block 706, the one or more margin regions include a third margin region (e.g., 682A) and a fourth margin region distinct from the third margin region (e.g., 682D), wherein the third margin region and the fourth margin region are non-symmetrical in shape. In some examples, different areas of the touch-sensitive surface have different probabilities of receiving valid user finger inputs. In such examples, the probability of an input being a false-positive varies by region. In some examples, it is beneficial to have areas that are less likely to receive valid user inputs be designated as margin regions that receive additional analysis/interrogation to reduce the likelihood of a false positive.

At block 708, the electronic device (e.g., 600), while the display (e.g., 602) is in a low-power state, (e.g., a minimal power state, an unpowered state, e.g., the state of FIG. 6A) detects, at the touch-sensitive surface (e.g., 602), an input (e.g., 620, 622H) (in some examples, the input is detected at a plurality of touch pixels of the array. In some examples, the plurality of touch pixels are contiguous touch pixels of the array).

At block 710, the electronic device (e.g., 600), in response to detecting the input (e.g., 620, 622H) (in some examples, the response to the input occurs on detection of lift-off of the input) and (712) in accordance with at least a portion of the input being in the one or more margin regions (e.g., at least one touch pixel is a margin pixel for an input that includes multiple touch pixels) and a determination that a first input-characteristic (e.g., a size or shape parameter, a characteristic intensity, a duration, finger lifts off) of the input meets at least one criterion of a first set of display-wake-rejection criteria, forgoes transitioning (e.g., maintaining the low-power state) the display (e.g., 602) from the low-power state to a high-power state (e.g., the state of FIG. 6E, a maximum power state, a normal operating power state, a powered state (e.g., when transitioning from an unpowered state)). In some examples, the one or more margin regions are portions of the touch-sensitive surface where false positives (e.g., inputs that should not be interpreted as a user touch that are incorrectly interpreted as a user touch) are more likely. In some examples, the one or more margin regions are the edges of the touch-sensitive surface. In some examples, the presence of water near the edge of the touch-sensitive surface, where the water can be grounded by the housing/casing bordering the touch sensitive surface, can make the water signal more similar to a signal generated by a user's fingers, thus increasing the likelihood of false positives. Forgoing transitioning from a low-power state to a high-power state upon receiving an input that meets display-wake-rejection criteria reduces power usage and improves battery life of the device by reducing the instances of unintended wake events (e.g., power state transitions).

In some examples, at block 714, the first input-characteristic is a duration of the input (e.g., 620, 622H), and the first set of display-wake-rejection criteria with a criterion that is met when the duration of the input is less than a threshold duration. In some examples, inputs having a duration that is less than empirically predicted for valid user inputs are rejected. In some examples, the first set of display-wake-rejection criteria includes a criterion that is met when the duration of the input is more than a threshold duration.

In some examples, at block 716, the first input-characteristic is a diameter (e.g., D, $D_{D1}$, $D_{D2}$) of the input (e.g., 620, 622H) (e.g., a minimum diameter, a minimum width of the touch area) (in some examples, the input-characteristic is a radius of the input), and the first set of display-wake-rejection criteria with a criterion that is met when the diameter of the input is below a first predetermined diameter value. In some examples, inputs having a diameter below a minimum value are highly unlikely to be valid user inputs, due to human physiology. Thus, such inputs have a higher probability of being false-positives. In some examples, the diameter of the input is calculated based on the standard deviation of the touch in the horizontal and vertical dimensions.

In some examples, at block 718, the first input-characteristic is a degree of movement of the input (e.g., 620, 622H) (e.g., a degree of movement calculated from initial detection (e.g., initial contact) of the input until the input ends (e.g., lifts-off)), and the first set of display-wake-rejection criteria with a criterion that is met when the degree of movement of the input is greater than a predetermined movement value (e.g., a permissible amount or magnitude of movement).

In some examples, at block 720, the first input-characteristic is a diameter (e.g., D, $D_{D1}$, $D_{D2}$) of the input (e.g., 620, 622H) (e.g., a maximum diameter, a maximum width of the touch area) (in some examples, the input-characteristic is a radius of the input), and the first set of display-wake-rejection criteria with a criterion that is met when the diameter of the input is above a second predetermined diameter value. In some examples, inputs having a diameter above a maximum value are highly unlikely to be valid (e.g., intentional) user inputs intended as wake events, due to human physiology (e.g., a user accidentally covering the surface with their hand). Thus, such inputs have a higher probability of being false-positives. In some examples, the diameter of the input is calculated based on the standard deviation of the touch in the horizontal and vertical dimensions.

In some examples, at block 722, the first input-characteristic is the magnitude of a signal generated by the input (e.g., 620, 622H) that is indicative of the amount of water present (e.g., the area of the touch-sensitive surface on which water is detected) on the touch-sensitive surface detected during the input. In such examples, the first set of display-wake-rejection criteria with a criterion that is met when the amount of water present is above a predetermined water amount value. In some examples, the amount of water is detected using two signals (e.g., a bootstrapped and a non-bootstrapped signals) that, together, isolate the component of the input that corresponds to non-water based sources (e.g., finger touches). In such examples, the signal that is responsive to water (e.g., the non-bootstrapped signal) can also be used to determine the area of the touch-sensitive surface that is covered by water. Further in such examples, inputs corresponding to a high amount of water present can be rejected.

In some examples, at block 724, the input (e.g., 620, 622H) is based on signals detected at a plurality of touch pixels of the array of touch pixels (in some examples, the plurality of touch pixels are contiguous touch pixels of the array). In such examples, the electronic device, further in response to receiving the input, determines, based on the signals detected at the plurality of touch pixels and the spatial distribution (e.g., the shape, the pattern, the width of the shape of the plurality of touch pixels in one or more directions) of the plurality of touch pixels whether the spatial distribution of the plurality of touch pixels meets a pattern criteria (e.g., geometric pattern that is atypical for a finger input; a pattern that has aspect ratios of width-to-length that is atypical for a finger input (e.g., a "thin" input pattern)). Further in such examples, in accordance with the distribution of the plurality of touch pixels meeting the pattern criteria, the electronic device determines if a maximum signal strength detected by any pixel of the plurality of touch pixels is below a predetermined maximum-signal-strength value. Subsequently in such examples, in accordance with the maximum signal strength detected by any pixel of the plurality of touch pixels being below a predetermined maximum-signal-strength value, the electronic device forgoes transitioning (e.g., maintaining the low-power state) the display from the low-power state to a high-power state (e.g., a maximum power state, a normal operating power state, a powered state (e.g., when transitioning from an unpowered state)). In some examples, inputs having one or more dimensions (e.g., a x-dimension, a y-dimension) that are below a threshold value are empirically more likely to be false-positives. However, not all inputs having one or more dimensions that are below a threshold value are false-positives (e.g., inputs formed by a portion of a user finger contacting along the edge of the touch-sensitive surface). In such embodiments, an additional signal strength (e.g., maximum signal strength detected at the plurality of touch pixels that detect the input) test can be applied to reduce the instances of false-negatives.

In some examples, the input (e.g., 620, 622H) is based on signals detected at a plurality of touch pixels of the array of touch pixels, the first input-characteristic is the maximum signal strength detected by any pixel of the plurality of touch pixels, and the first display-wake-rejection criteria with a criterion that is met when the maximum signal strength detected by any pixel of the plurality of touch pixels is below a predetermined signal strength value. In some examples, the signal strength (e.g., signal magnitude (in some examples, a voltage value)), from the pixel (among the touch pixels that form the input) having the highest signal strength, is compared against a predetermined signal strength value. If the signal strength is below that value, the input is rejected as a potential wake event. In such examples, early rejection, based on a maximum signal strength of the highest reporting touch pixel can conserve system resources and reject inputs that are overly "light" (e.g., generating overly weak signals).

In some examples, at block 726, the electronic device (e.g., 600), further in response to detecting the input (e.g., 620, 622H) and in accordance with a determination that at least a portion of the touch input is in the one or more margin regions (e.g., at least one touch pixel is a margin pixel for an input that includes multiple touch pixels) and a determination that a second input-characteristic of the input meets at least one criterion of a second set of display-wake-rejection criteria, forgoes transitioning (e.g., maintaining the low-power state) the display from the low-power state to a high-power state (e.g., a maximum power state, a normal operating power state, a powered state (e.g., when transitioning from an unpowered state)).

In some examples, at block 728, the input (e.g., 620, 622H) is based on signals detected at a plurality of touch pixels of the array of touch pixels (in some examples, the plurality of touch pixels are contiguous touch pixels of the array). In such examples, in response to receiving the input, the electronic device determines, based on the signals detected at the plurality of touch pixels and the spatial distribution (e.g., the shape, the pattern, the width of the shape of the plurality of touch pixels in one or more directions) of the plurality of touch pixels whether the spatial distribution of the plurality of touch pixels meets a pattern criteria (e.g., geometric pattern that is atypical for a finger input; a pattern that has aspect ratios of width-to-length that is atypical for a finger input (e.g., a "thin" input pattern)). Further in such examples, in accordance with the distribution of the plurality of touch pixels meeting the pattern criteria, the electronic device determines if a characteristic intensity of the input meets a first predetermined characteristic intensity value (e.g., an intensity threshold, a minimum intensity value indicative of a valid finger contact, a characteristic intensity that is highly unlikely to be associated with an input formed by water on the touch-sensitive surface). Further yet in such examples, in accordance with the characteristic intensity of the input not meeting the first predetermined characteristic intensity value, the electronic device forgoes transitioning (e.g., maintaining the low-power state) the display from the low-power state to a high-power state. (e.g., a maximum power state, a normal operating power state, a powered state (e.g., when transitioning from an unpowered state)). In some examples, inputs having one or more dimensions (e.g., a x-dimension, a y-dimension) that are below a threshold value are empirically more likely to be false-positives. However, not all inputs having one or more dimensions that are below a threshold value are false-positives (e.g., inputs formed by a portion of a user finger contacting along the edge of the touch-sensitive surface). In such embodiments, an additional intensity test can be applied to reduce the instances of false-negatives.

In some examples, the electronic device (e.g., 600) includes one or more contact intensity sensors (e.g., 165, 359, 524). Further in such examples, in response to detecting the input (e.g., 620, 622H), the electronic device, in accordance with at least a portion of the input being in the one or more margin regions (e.g., at least one touch pixel is a margin pixel for an input that includes multiple touch pixels) (in some examples, the characteristic intensity is tested only if a centroid (e.g., 692, 692H) of the input falls within the one or margin regions) and a determination that a characteristic intensity of the input meets or exceeds a second characteristic intensity threshold, transitions the display from the low-power state to the high power state. (e.g., a minimum intensity value to avoid rejection as a wake event). In some examples, inputs having a high characteristic intensity are likely to be valid user inputs (and not a false-positive). In such examples, inputs having high characteristic intensity are processed as wake events, even if they fall in a region of the display that is empirically shown to have a high occurrence of false-positives.

In some examples, the second input-characteristic is a centroid (e.g., 692, 692H) of the input (e.g., 620, 622H) (e.g., the geometric mean, a geometric mean taken into account just the horizontal (e.g., "x") and vertical dimensions (e.g., "y"), the geometric center of the input), and the second set of display-wake-rejection criteria with a criterion that is met when the centroid of the input is within the one or more margin regions. In some examples, valid finger inputs are empirically unlikely to have their centroids on the edges of the touch-sensitive surface. In such examples, defining margin regions at the edges of the surface and employing those margin regions as "deadzones" where inputs with a centroid in those regions are rejected as wake events (e.g., input events that transition the device to a high-power state) can reduce the occurrence of false positives.

In some examples, the electronic device (e.g., 600), in detecting the input (e.g., 620, 622H), detects signals at a plurality of touch pixels of the array of touch pixels and the centroid (e.g., 692, 602H) is determined based on only the pixels of the plurality of touch pixels that have a signal above a threshold signal value (e.g., a noise filter value). In some examples, signals from the touch pixels included in an input are filtered to exclude pixels with signals that fall below a threshold signal value (e.g., filtered to remove noisy pixels). In such examples, only pixels with signals that are above the threshold signal (e.g., non-noisy pixels) are used to calculate the centroid (or used for other various calculations detailed herein).

In some examples, the second input-characteristic is a characteristic intensity of the input (e.g., 620, 622H), and the second set of display-wake-rejection criteria with a criterion that is met when the characteristic intensity of the input is below a first predetermined characteristic intensity value (e.g., a low intensity value when the input falls (e.g., a least a portion of the input includes a margin region; the centroid (e.g., 692, 692H) of the input is in a margin region) in a margin region causes rejection of the wake event). In some examples, inputs having a low characteristic intensity, when located in a margin region (e.g., a region that empirically has a lower probability of receiving valid inputs), are not likely to be valid user inputs (and not a false-negative). In such examples, inputs having low characteristic intensity are rejected as wake events.

In some examples, the input (e.g., 620, 622H) is based on signals detected at a plurality of touch pixels of the array of touch pixels, the second input-characteristic is the maximum signal strength detected by any pixel of the plurality of touch pixels, and the second set of display-wake-rejection criteria includes a criterion that is met when the maximum signal strength detected by any pixel of the plurality of touch pixels is below a second predetermined signal strength value. In some examples, the signal strength (e.g., signal magnitude (in some examples, a voltage value)), from the pixel (among the touch pixels that form the input) having the highest signal strength, is compared against a predetermined signal strength value. If the signal strength is below that value, the input is rejected as a potential wake event. Inputs having a low signal strength, when located in a margin region (e.g., a region that empirically has a lower probability of receiving valid user inputs), are not likely to be valid user inputs (and not a false-negative.) In such examples, inputs having a low signal strength are rejected as wake events.

In some examples, at block 730, further in response to detecting the input (e.g., 620, 622H), the electronic device determines whether the first input-characteristic of the input meets the first set of display-wake-rejection criteria, wherein determining whether the first input-characteristic of the input meets at least one criterion of the first set of display-wake-rejection criteria occurs after a predetermined period of time after the input is initially detected. In some examples, the electronic device employs a hysteresis period to prevent the premature rejection of a potential wake event. In such examples, one or more criterion of the first set of display-wake-rejection criteria is determined after the hysteresis period has expired. Further in such examples, doing so can reduce the instances of false positives (e.g., by prematurely accepting inputs that subsequently display one or more characteristics that would cause rejection (e.g., initially stable inputs that later exhibit unacceptable movement) and also reduce the instances of false negatives (e.g., inputs that are initially noisy but stability in short order).

In some examples, at block 732, the electronic device (e.g., 600), further in response to detecting the input (e.g., 620, 622H), determines whether the second input-characteristic of the input meets the second set of display-wake-rejection criteria, wherein determining whether the second input-characteristic of the input meets at least one criterion of the second set of display-wake-rejection criteria occurs after a predetermined period of time after the input is initially detected. In some examples, the electronic device employs a hysteresis period to prevent the premature rejection of a potential wake event. In such examples, one or more criterion of the second set of display-wake-rejection criteria is determined after the hysteresis period has expired. Further in such examples, doing so can reduce the instances of false positives (e.g., by prematurely accepting inputs that subsequently display one or more characteristics that would cause rejection (e.g., initially stable inputs that later exhibit unacceptable movement) and also reduce the instances of false negatives (e.g., inputs that are initially noisy but stability in short order).

In some examples, further in response to detecting the input (e.g., 620, 622H), the electronic device, in accordance with no first input-characteristic (e.g., no assessed input-characteristic) of the input meeting the first set of display-wake-rejection criteria, transitions the display from the low-power state to the high-power state. In some examples, the electronic device performs a finite assessment of whether various input-characteristics of the input meet the various criterion of the display-wake-rejection criteria. If none of the assessments return a matching result (e.g., no assessed input-characteristic meets the display-wake-rejection criteria), then the electronic device processes the input as a wake event.

In some examples, further in response to detecting the input (e.g., 620, 622H), the electronic device, in accordance with no second input-characteristic (e.g., no assessed input-characteristic) of the input meeting the second set of display-wake-rejection criteria, transitions the display from the low-power state to the high-power state. In some examples, the electronic device performs a finite assessment of whether various input-characteristics of the input meet the various criterion of the display-wake-rejection criteria. If none of the assessments return a matching result (e.g., no assessed input-characteristic meets the display-wake-rejection criteria), then the electronic device processes the input as a wake event.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
a display;
a touch-sensitive surface including an array of touch pixels, the array of touch pixels including one or more margin regions and one or more non-margin regions;
one or more processors; and
memory storing one or more programs configured to be executed by the one or more processors, the one or more programs including instructions for:
while the display is in a low-power state, detecting, at the touch-sensitive surface, an input, wherein the input is based on signals detected at a plurality of touch pixels of the array of touch pixels; and
in response to detecting the input:
in accordance with at least a portion of the input being in the one or more margin regions and a determination that a first input-characteristic of the input meets at least one criterion of a first set of display-wake-rejection criteria, forgoing transitioning the display from the low-power state to a high-power state,
wherein the first input-characteristic is the maximum signal strength detected by the plurality of touch pixels, and
the first set of display-wake-rejection criteria includes a criterion that is met when the maximum signal strength detected by the plurality of touch pixels is below a predetermined signal strength value.

2. The electronic device of claim 1, wherein:
the first input-characteristic is a duration of the input; and
the first set of display-wake-rejection criteria includes a criterion that is met when the duration of the input is less than a threshold duration.

3. The electronic device of claim 1, wherein:
the first input-characteristic is a diameter of the input; and
the first set of display-wake-rejection criteria includes a criterion that is met he diameter of the input is below a first predetermined diameter value.

4. The electronic device of claim 1, wherein:
the first input-characteristic is a degree of movement of the input, and the first set of display-wake-rejection criteria includes a criterion that is met when the degree of movement of the input is greater than a predetermined movement value.

5. The electronic device of claim 1, wherein:
the first input-characteristic is a diameter of the input; and
the first set of display-wake-rejection criteria includes a criterion that is met when the diameter of the input is above a second predetermined diameter value.

6. The electronic device of claim 1, wherein:
the first input-characteristic is a magnitude of a signal generated by the input that is indicative of the amount of water present on the touch-sensitive surface detected during the input; and
the first set of display-wake-rejection criteria includes a criterion that is met when the amount of water present is above a predetermined water amount value.

7. The electronic device of claim 1, wherein the electronic device includes one or more contact intensity sensors and the input is based on signals detected at a plurality of touch pixels of the array of touch pixels, the one or more programs further including instructions for:
further in response to receiving the input:
determining, based on the signals detected at the plurality of touch pixels and the spatial distribution of the plurality of touch pixels whether the spatial distribution of the plurality of touch pixels meets a pattern criteria;
in accordance with the distribution of the plurality of touch pixels meeting the pattern criteria, determining if a characteristic intensity of the input meets characteristic intensity value; and
in accordance with the characteristic intensity of the input not meeting the first predetermined characteristic intensity value, forgoing transitioning the display from the low-power state to a high-power state.

8. The electronic device of claim 1, wherein the input is based on signals detected at a plurality of touch pixels of the array of touch pixels, the one or more programs further including instructions for:
further in response to receiving the input:
determining, based on the signals detected at the plurality of touch pixels and the spatial distribution of the plurality of touch pixels whether the spatial distribution of the plurality of touch pixels meets a pattern criteria;
in accordance with the distribution of the plurality of touch pixels meeting the pattern criteria, determining if a maximum signal strength detected by any pixel of the plurality of touch pixels is below a predetermined maximum-signal-strength value; and
in accordance with the maximum signal strength detected by any pixel of the plurality of touch pixels being below a predetermined maximum-signal-strength value, forgoing transitioning the display from the low-power state to a high-power state.

9. The electronic device of claim 1, the one or more programs further including instructions for:
further in response to detecting the input:
in accordance with a determination that at least a portion of the touch input is in the one or more margin regions and a determination that a second input-characteristic of the input meets at least one criterion of a second set of display-wake-rejection criteria, forgoing transitioning the display from the low-power state to a high-power state.

10. The electronic device of claim 9, wherein the one or more margin regions includes a first margin region that is adjacent to at least one edge of the touch-sensitive surface.

11. The electronic device of claim 9, wherein:
the touch sensitive surface includes one or more corner areas; and
the one or more margin regions include a second margin region that includes at least one corner area of the touch-sensitive surface.

12. The electronic device of claim 9, wherein the one or more margin regions include a third margin region and a fourth margin region distinct from the third margin region, wherein the third margin region and the fourth margin region are non-symmetrical in shape.

13. The electronic device of claim 9, wherein:
the second input-characteristic is a centroid of the input; and
the second set of display-wake-rejection criteria includes a criterion that is met when the centroid of the input is within the one or more margin regions.

14. The electronic device of claim 13, wherein:
detecting the input includes detecting signals at a plurality of touch pixels of the array of touch pixels; and the centroid is determined based on only the pixels of the plurality of touch pixels that have a signal above a threshold signal value.

15. The electronic device of claim 9, wherein the electronic device includes one or more contact intensity sensors, the one or more programs further including instructions for:
further in response to detecting the input:
in accordance with at least a portion of the input is in the one or more margin regions and a determination that a characteristic intensity of the input meets or exceeds a second characteristic intensity threshold, transitioning the display from the low-power state to the high-power state.

16. The electronic device of claim 9, wherein:
the second input-characteristic is a characteristic intensity of the input; and
the second set of display-wake-rejection criteria includes a criterion that is met when the characteristic intensity of the input is below a first predetermined characteristic intensity value.

17. The electronic device of claim 9, wherein:
the input is based on signals detected at a plurality of touch pixels of the array of touch pixels;
the second input-characteristic is the maximum signal strength detected by any pixel of the plurality of touch pixels; and
the second set of display-wake-rejection criteria includes a criterion that is met when the maximum signal strength detected by any pixel of the plurality of touch pixels is below a second predetermined signal strength value.

18. The electronic device of claim 9, the one or more programs further including instructions for:
further in response to detecting the input:
in accordance with no second input-characteristic of the input meeting the second set of display-wake-rejection criteria, transitioning the display from the low-power state to the high-power state.

19. The electronic device of claim 1, the one or more programs further including instructions for:
further in response to detecting the input:
determining whether the first input-characteristic of the input meets the first set of display-wake-rejection criteria; and
wherein determining whether the first input-characteristic of the input meets at least one criterion of the first set of display-wake-rejection criteria occurs after a predetermined period of time after the input is initially detected.

20. The electronic device of claim 19, the one or more programs further including instructions for:
further in response to detecting the input:
determining whether the second input-characteristic of the input meets the second set of display-wake-rejection criteria; and
wherein determining whether the second input-characteristic of the input meets at least one criterion of the second set of display-wake-rejection criteria occurs after a predetermined period of time after the input is initially detected.

21. The electronic device of claim 1, the one or more program further including instructions for:
further in response to detecting the input:
in accordance with no first input-characteristic of the input meeting the first set of display-wake-rejection criteria, transitioning the display from the low-power state to the high-power state.

22. A non-transitory computer-readable storage medium storing one or more programs configured to he executed by one or more processors of an electronic device with a display and a touch-sensitive surface including an array of touch pixels, the array of touch pixels including one or more margin regions and one or more non-margin regions, the one or more programs including instructions for:
while the display is in a low-power state, detecting, at the touch-sensitive surface, an input, wherein the input is based on signals detected at a plurality of touch pixels of the array of touch pixels; and
in response to detecting the input:
in accordance with at least a portion of the input being in the one or more margin regions and a determination that a first input-characteristic of the input meets at least one criterion of a first set of display-wake-rejection criteria, forgoing transitioning the display from the low-power state to a high-power state,
wherein the first input-characteristic is the maximum signal strength detected by the plurality of touch pixels, and
the first set of display-wake-rejection criteria includes a criterion that is met when the maximum signal strength detected by the plurality of touch pixels is below a predetermined signal strength value.

23. A method, comprising:
at an electronic device having a display and a touch-sensitive surface including an array of touch pixels, the array of touch pixels including one or more margin regions and one or more non-margin regions:
while the display is in a low-power state, detecting, at the touch-sensitive surface, an input, wherein the input is based on signals detected at a plurality of touch pixels of the array of touch pixels; and
in response to detecting the input:
in accordance with at least a portion of the input being in the one or more margin regions and a determination that a first input-characteristic of the input meets at least one criterion of a first set of display-wake-rejection criteria, forgoing transitioning the display from the low-power state to a high-power state,
wherein the first input-characteristic is the maximum signal strength detected by the plurality of touch pixels, and
the first set of display-wake-rejection criteria includes a criterion that is met when the maximum signal strength detected by the plurality of touch pixels is below a predetermined signal strength value.

* * * * *

UNITED STATES PATENT AND TRADEMARK OFFICE
CERTIFICATE OF CORRECTION

PATENT NO. : 10,585,536 B2
APPLICATION NO. : 15/859067
DATED : March 10, 2020
INVENTOR(S) : Sean E. O'Connor Page 1 of 1

It is certified that error appears in the above-identified patent and that said Letters Patent is hereby corrected as shown below:

In the Claims

In Claim 3, at Column 49, Line 42, delete "he" and insert -- when the --, therefor.

In Claim 22, at Column 52, Line 10, delete "he" and insert -- be --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*